Feb. 2, 1960 P. W. WADSWORTH 2,923,772

TELEPHONE EMERGENCY REPORTING ALARM SYSTEM

Filed Oct. 27, 1958 16 Sheets-Sheet 1

INVENTOR
P. W. WADSWORTH
BY S.E. Hollander
ATTORNEY

INVENTOR
P. W. WADSWORTH
BY
S.E. Hollander
ATTORNEY

TELEPHONE EMERGENCY REPORTING ALARM SYSTEM

Filed Oct. 27, 1958 16 Sheets-Sheet 2

INVENTOR
P. W. WADSWORTH
BY S. E. Hollander
ATTORNEY

Feb. 2, 1960 P. W. WADSWORTH 2,923,772

TELEPHONE EMERGENCY REPORTING ALARM SYSTEM

Filed Oct. 27, 1958 16 Sheets-Sheet 3

INVENTOR
P. W. WADSWORTH
BY S. E. Hollander
ATTORNEY

INVENTOR
P. W. WADSWORTH
BY
S.E. Hollander
ATTORNEY

Feb. 2, 1960 P. W. WADSWORTH 2,923,772

TELEPHONE EMERGENCY REPORTING ALARM SYSTEM

Filed Oct. 27, 1958 16 Sheets-Sheet 6

INVENTOR
P. W. WADSWORTH
BY
S. E. Hollander
ATTORNEY

INVENTOR
P. W. WADSWORTH
BY
S. E. Hollander
ATTORNEY

Feb. 2, 1960 P. W. WADSWORTH 2,923,772

TELEPHONE EMERGENCY REPORTING ALARM SYSTEM

Filed Oct. 27, 1958 16 Sheets-Sheet 8

INVENTOR
BY P. W. WADSWORTH
S.E. Hollander
ATTORNEY

Feb. 2, 1960 P. W. WADSWORTH 2,923,772

TELEPHONE EMERGENCY REPORTING ALARM SYSTEM

Filed Oct. 27, 1958 16 Sheets-Sheet 9

INVENTOR
P. W. WADSWORTH
BY S. E. Hollander
ATTORNEY

Feb. 2, 1960 P. W. WADSWORTH 2,923,772

TELEPHONE EMERGENCY REPORTING ALARM SYSTEM

Filed Oct. 27, 1958 16 Sheets-Sheet 10

INVENTOR
P. W. WADSWORTH
BY
S.E. Hollander
ATTORNEY

TELEPHONE EMERGENCY REPORTING ALARM SYSTEM

Filed Oct. 27, 1958 16 Sheets-Sheet 11

INVENTOR
P. W. WADSWORTH
BY S.E. Hollander
ATTORNEY

TELEPHONE EMERGENCY REPORTING ALARM SYSTEM

Filed Oct. 27, 1958 16 Sheets-Sheet 12

INVENTOR
BY P. W. WADSWORTH
S.E. Hollander
ATTORNEY

INVENTOR
P. W. WADSWORTH
BY
S.E. Hollander
ATTORNEY

Feb. 2, 1960 P. W. WADSWORTH 2,923,772

TELEPHONE EMERGENCY REPORTING ALARM SYSTEM

Filed Oct. 27, 1958 16 Sheets-Sheet 14

INVENTOR
P. W. WADSWORTH
BY
S. E. Hollander
ATTORNEY

INVENTOR
P. W. WADSWORTH
BY S.E. Hollander
ATTORNEY

Feb. 2, 1960 P. W. WADSWORTH 2,923,772

TELEPHONE EMERGENCY REPORTING ALARM SYSTEM

Filed Oct. 27, 1958 16 Sheets-Sheet 16

INVENTOR
P. W. WADSWORTH
BY
S.E. Hollander
ATTORNEY

United States Patent Office 2,923,772

Patented Feb. 2, 1960

2,923,772

TELEPHONE EMERGENCY REPORTING ALARM SYSTEM

Paul W. Wadsworth, Massapequa Park, N.Y., assignor to Bell Telephone Laboratories, Incorporated, New York, N.Y., a corporation of New York Application October 27, 1958, Serial No. 769,934

32 Claims. (Cl. 179—5)

This invention relates to emergency telephone reporting alarm systems and more particularly to reporting systems wherein calling lines are terminated at a concentrator location from which calls are extended over trunk conductors to the destination.

A number of known reporting alarm systems are predicated on a direct connection between a calling emergency substation and the service facility sought to be reached, i.e., fire or police headquarters.

In relatively densely populated areas including large cities, however, a considerable number of emergency substations may be located at a distance from the desired headquarters. The economic burden of providing a direct connection between a relatively large number of distant emergency substations and each headquarters location militates against use of conventional direct connection systems.

In these circumstances, substation line concentration is a virtual necessity. Emergency substations are terminated at centrally located facilities proximate to the largest number of stations and thereafter calls are extended over a comparatively limited number of trunks to the desired headquarters location.

Although this practice largely overcomes the major economic obstacles, in doing so, it gives rise to a number of technological problems unique to the concentration of emergency substation lines. For example, the very low usage of emergency substation lines in comparison to normal telephone lines dictates a system of concentration in which the ratio of the number of calling lines to the number of trunks available to said lines is very high. Structural facilities are therefore necessary to achieve the high concentration factor.

An additional consideration, singular to emergency reporting systems of the concentrator type, is the means required for identifying the calling substation. In ordinary emergency systems where each substation is directly connected to the service headquarters, the identification problem is less critical since each line has a unique appearance at the respective headquarters' switchboards. An appropriate grouping of the lines in specified physical switch locations yields information at the headquarters indicative of the identification of the calling line. But in the case of concentrator emergency reporting systems, where lines terminate at a concentrator location and do not physically reach the ultimate destination, the identification factor is rendered substantially more intricate. It is necessary to render an identification of the calling substation and transmit that identification over common facilities to a headquarters location.

Moreover, it is implicit in the nature of emergency systems that speed and accuracy of communication are vital at all times. Thus, provisions must be made for recording or noting an emergency service request in instances where the emergency service operator or attendant may be preoccupied with a number of simultaneous requests. Such a situation is likely to develop in the event of widespread natural disaster or military action.

It becomes essential in such instances to provide facilities for making recorded evidence of the identification of calling emergency substations and the time such requests were made.

It is also important in the proper disposition of a number of concurrent emergency service requests in a concentrator system to permit the operator to speak with a given caller, temporarily disconnect without losing the trunk connection to speak with another caller requesting service, and be able to reconnect with the first caller. Since, in a case of this nature, the operator is speaking over a commonly shared trunk with the callers and since conservative measures dictate that the identification of the calling party be made available to the operator, each time the operator communicates with said party, the switching facilities must include a number of unconventional functional capabilities.

An additional problem encountered in emergency concentrator systems which service both police and fire emergency calls is the necessity to ascertain at the initiation of each call which type of service the caller is requesting. The usefulness and adaptability of emergency systems is, of course, markedly enhanced when the dual service features of both police and fire headquarters are available. A system of this type, in addition to the usual fire reporting function, lends itself to use by police patrolmen for routine reports at periodical intervals to police headquarters. An advantage of the use of this type of emergency system for police reporting is the provision of a permanent printed record of the time that the routine report is made by the policeman and the location of the substation from which the report originates.

It is, therefore, an object of this invention to provide an emergency reporting system wherein calling lines are concentrated at a central location, connections to fire or police headquarters being effected over a relatively limited number of trunks.

An additional object of this invention is to provide for simple and rapid identification of the calling emergency substation.

A further object of this invention is to provide a visual display of the identification of the calling substation before the headquarters operator or attendant.

Another object of this invention is to provide a printed record of the identification of an emergency substation requesting service and the time said service is requested.

An additional object of this invention is to separate the identification function required to provide the visual display before the operator and the identification function required to provide information for a printed record of the emergency service request.

Still anotner object of this invention is to provide for the transmission of intelligence relevant to the visual display identification over the same trunk ultimately used by the operator as a communication path.

A further object of the invention is to provide for the transmission of intelligence relevant to the printed identification of the calling substation over an entirely independent transmission path.

Still another object of this invention is to provide a simple and economical arrangement for discriminating between fire and police emergency calls.

A further object of this invention is to provide for a visual redisplay of the calling substation identification number when an operator reconnects to the trunk over which the call has been extended after having previously disconnected therefrom without having released the trunk.

An additional object of this invention is to provide for a high ratio of concentration between incoming substation lines to a telephone central office and outgoing trunks to fire and police headquarters' destinations.

A feature of this invention is the use of an asymmetrically conducting device connected in the remotely located emergency substation for use in discriminating between fire and police emergency calls.

Another feature of this invention is a routing switch located at the emergency substation and arranged to normally by-pass the asymmetrically conducting device and to insert the asymmetrically conducting device in circuit when said routing switch is operated.

An additional feature of this invention is the electrical rearrangement of a crossbar switch to permit servicing a larger number of substation lines than heretofore.

Still another feature of this invention is to connect two groups of calling lines to two separate horizontal multiples respectively of a crossbar switch, each of said groups having access to corresponding vertical trunk groups.

A further feature of this invention is the reservation of a single vertical in each trunk group for communication between a calling line and common control equipment.

An additional feature of this invention includes relay equipment for disconnecting from a trunk over which an emergency substation line has been extended and holding the switching train operated.

Still another feature includes relay equipment and cold cathode indicator tubes for providing a visual redisplay of a calling line number when the attendant reconnects to a trunk over which a call has been extended.

A further feature of this invention includes switching equipment for transmitting the directory identification of a calling emergency substation over the same trunk that is ultimately used for voice communication.

An additional feature of this invention includes switching facilities for transferring the equipment designation of a calling emergency substation over a path divorced from that utilized for forwarding the directory identification.

Another feature of this invention includes marginal relay equipment for safeguarding against spurious operation of an excessive number of select magnets in a given switch.

A further feature of this invention includes marginal relay equipment for preventing the operation of an excessive number of vertical magnets in a particular switch.

Still another feature of this invention includes relay equipment for routing a particular emergency substation line to one of a group of fire emegency headquarters and to one of a group of police emergency headquarters.

These and other objects and features of the invention may be more readily understood from an examination of the following detailed description and attached drawing, in which.

Figures 1, 16:
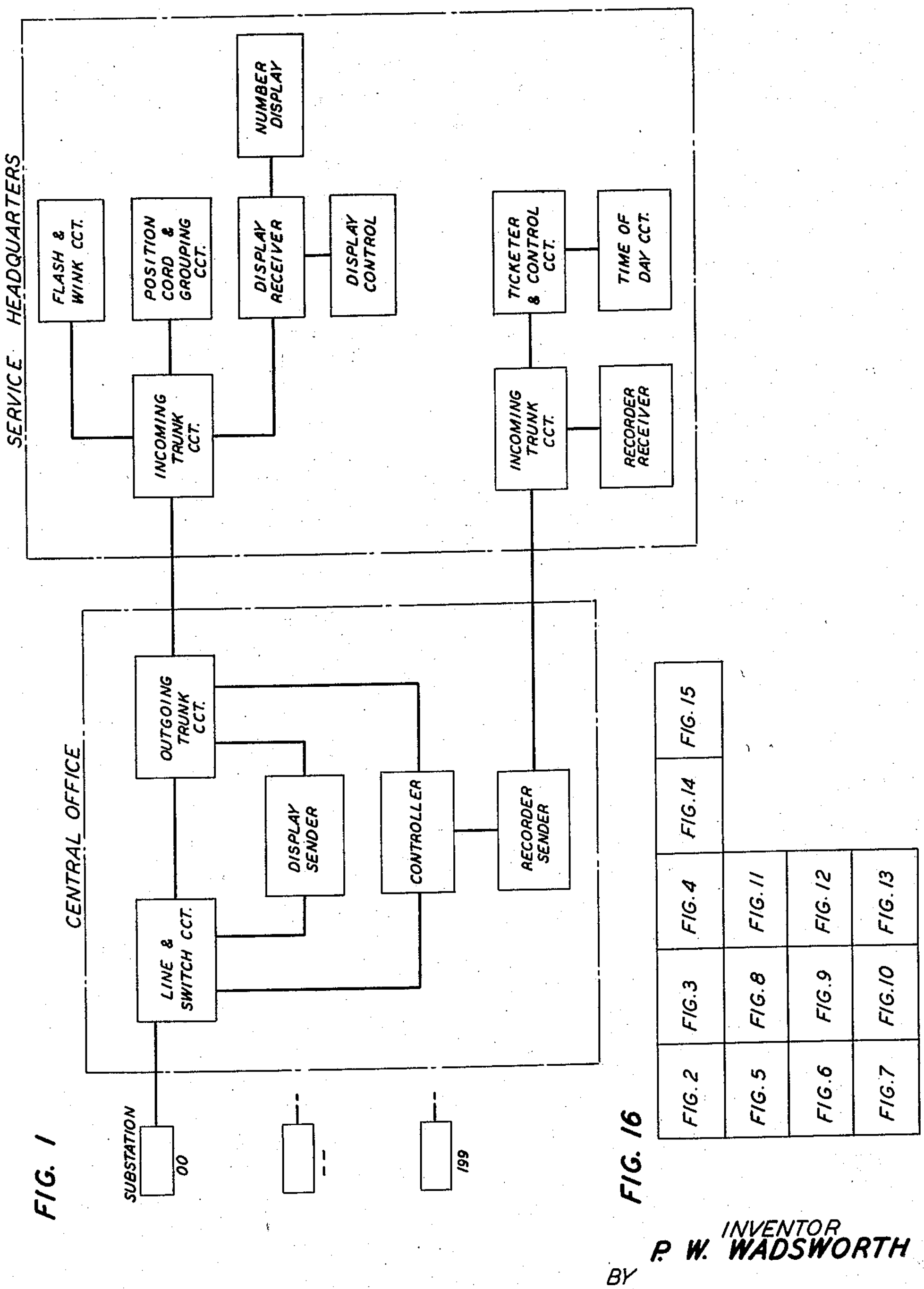
Fig. 1 is a block diagram of the component elements of the subject invention.
Figure 5:
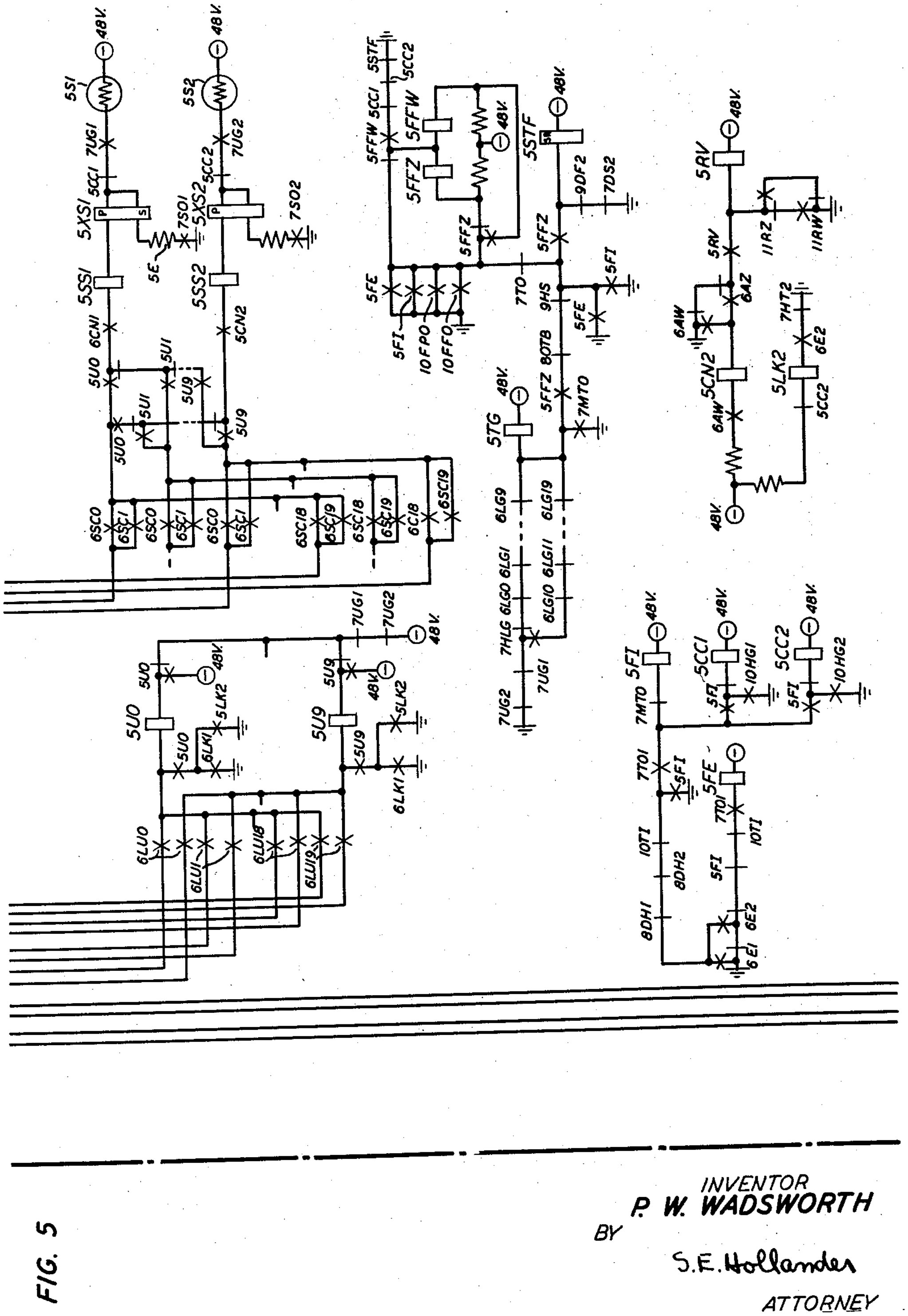
Figure 4:
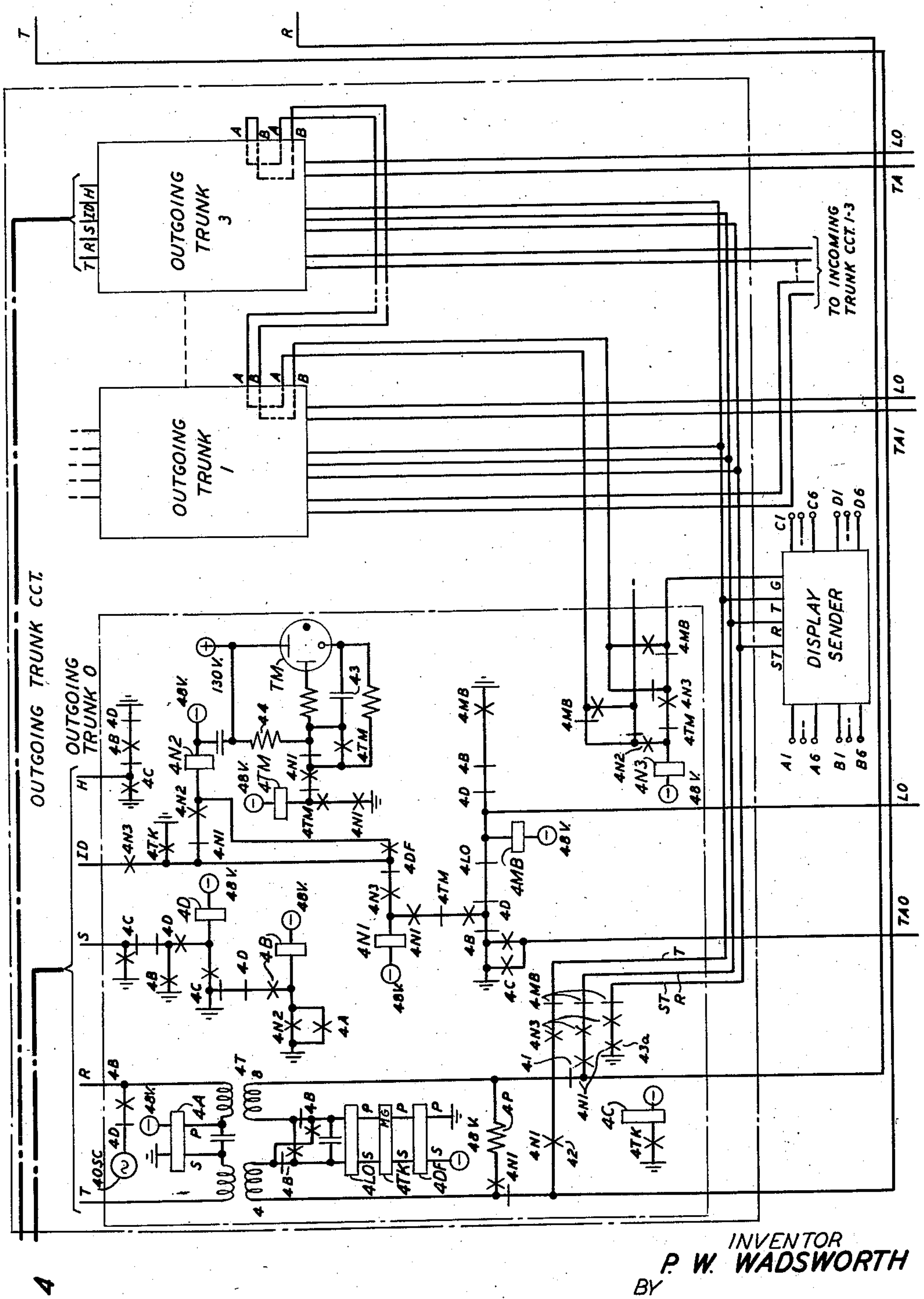
Figure 6:
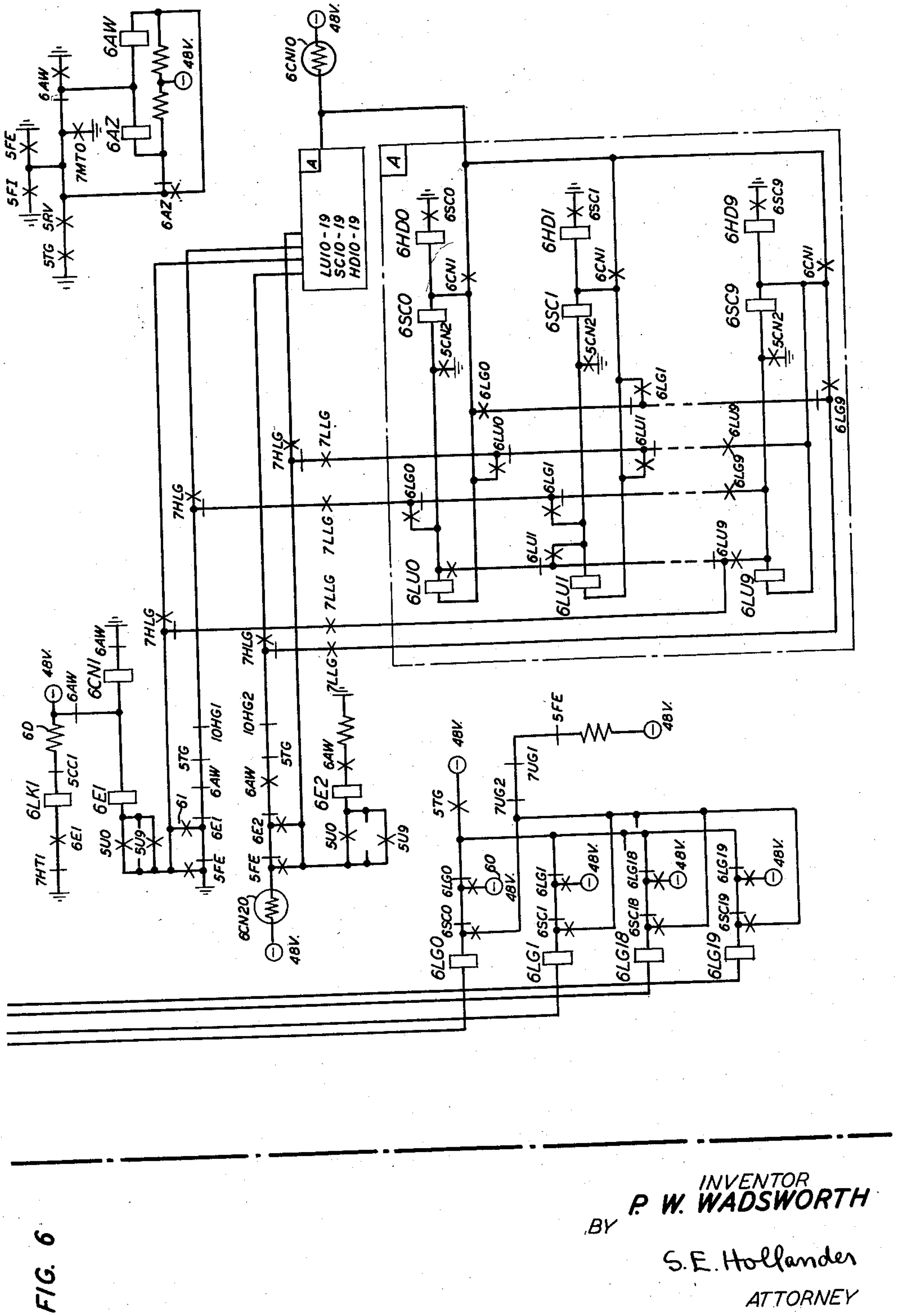
Figure 7:
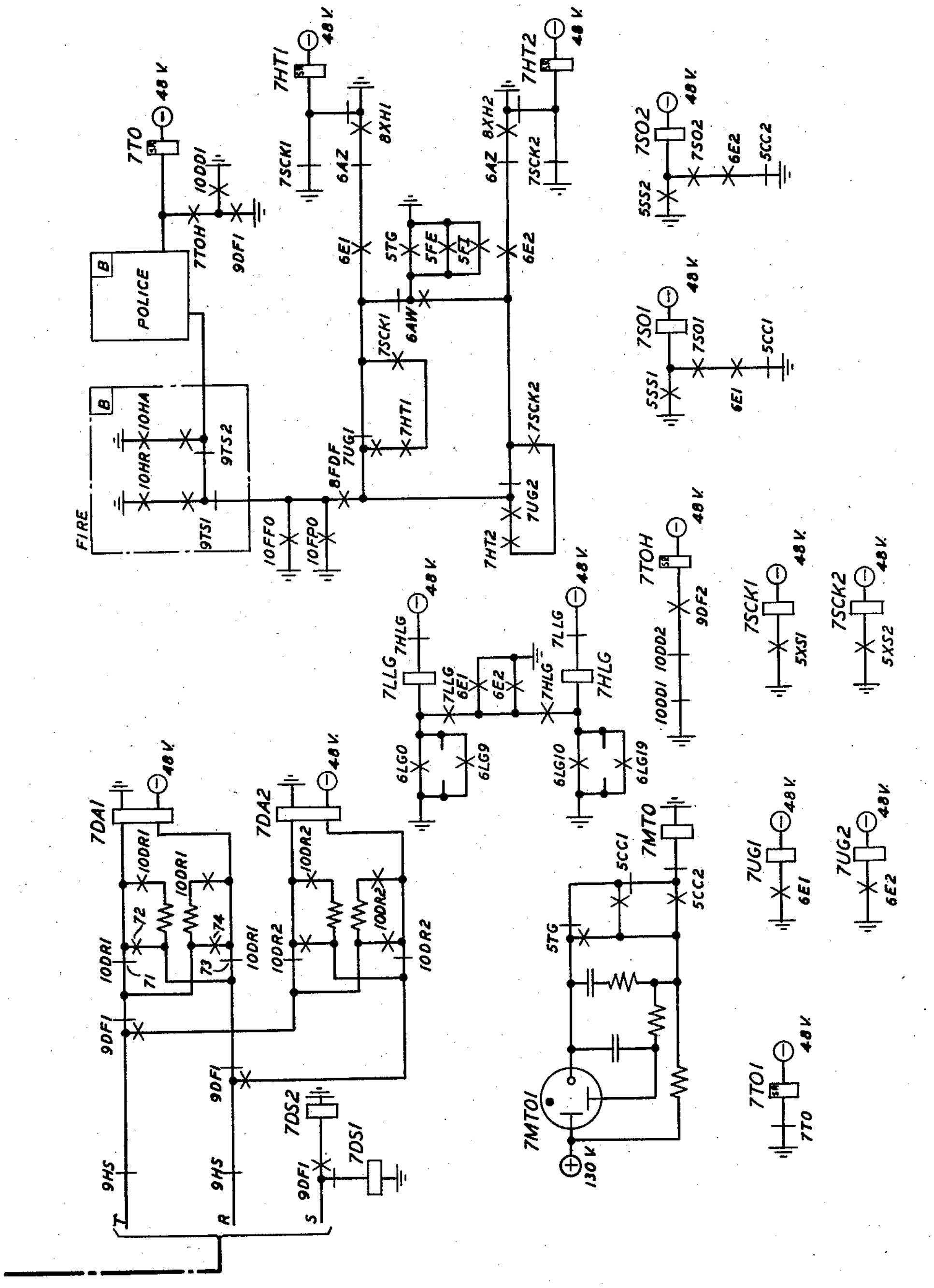
Figure 8:
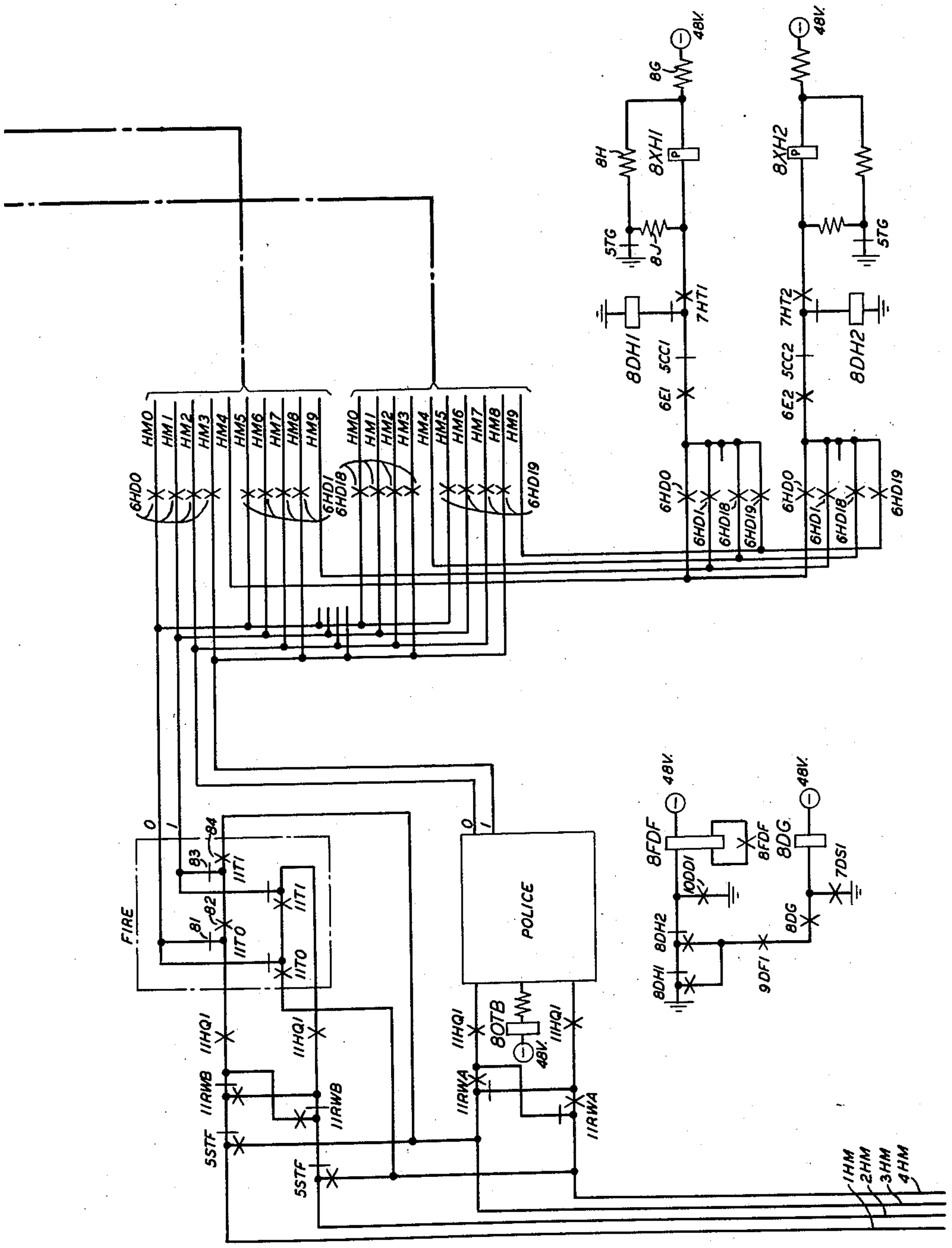
Figure 9:
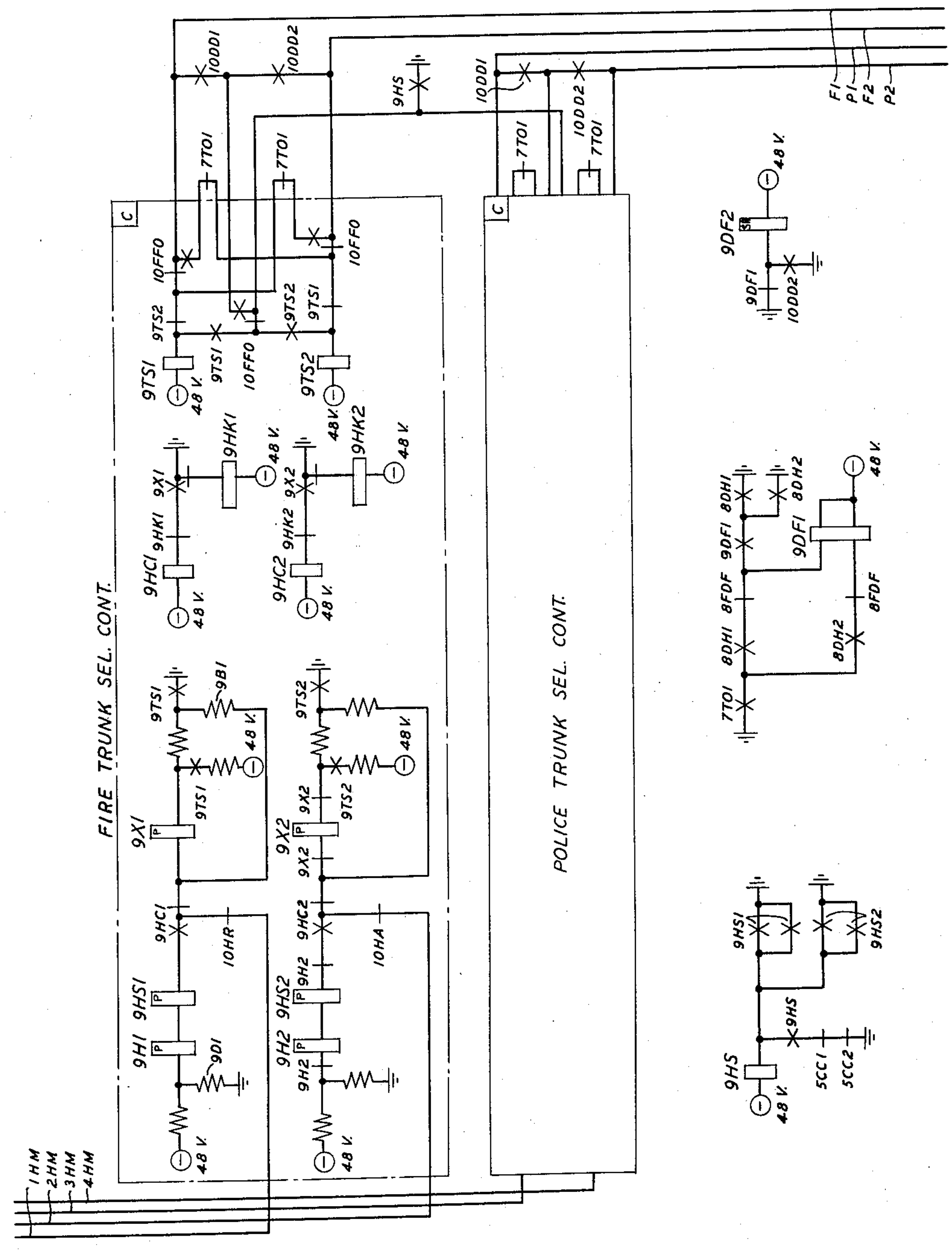
Figure 10:
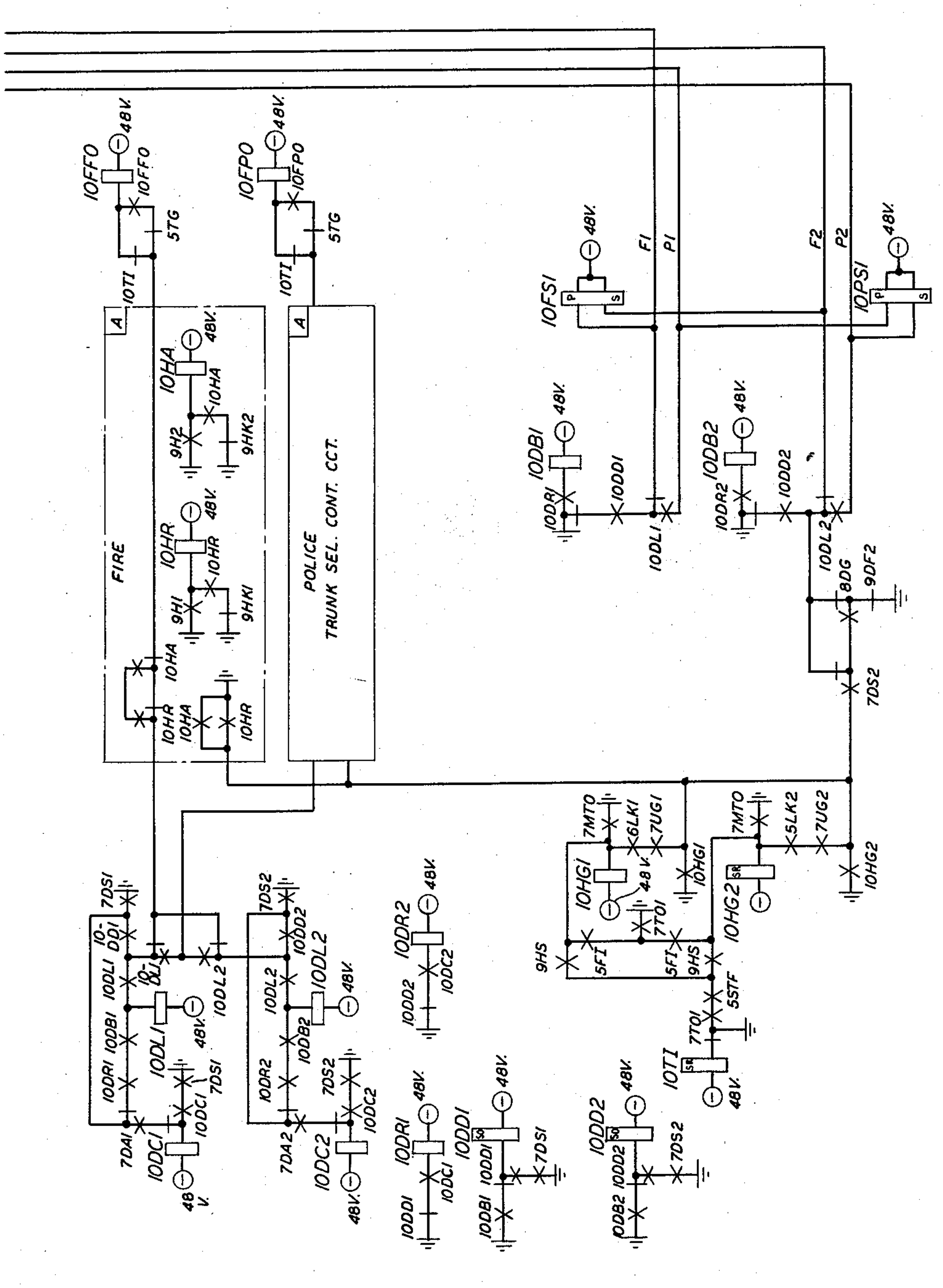
Figure 11:
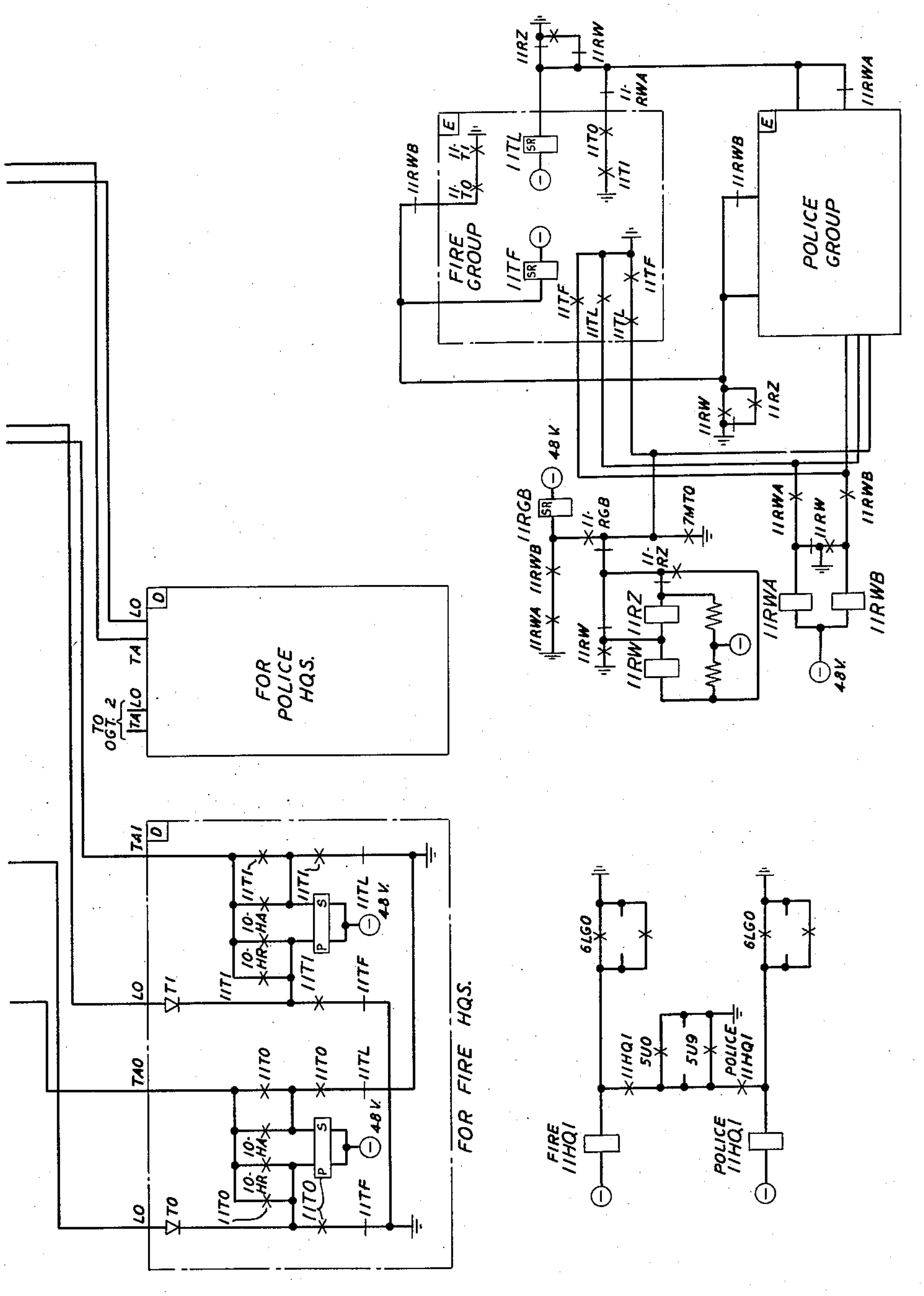
Figure 12:
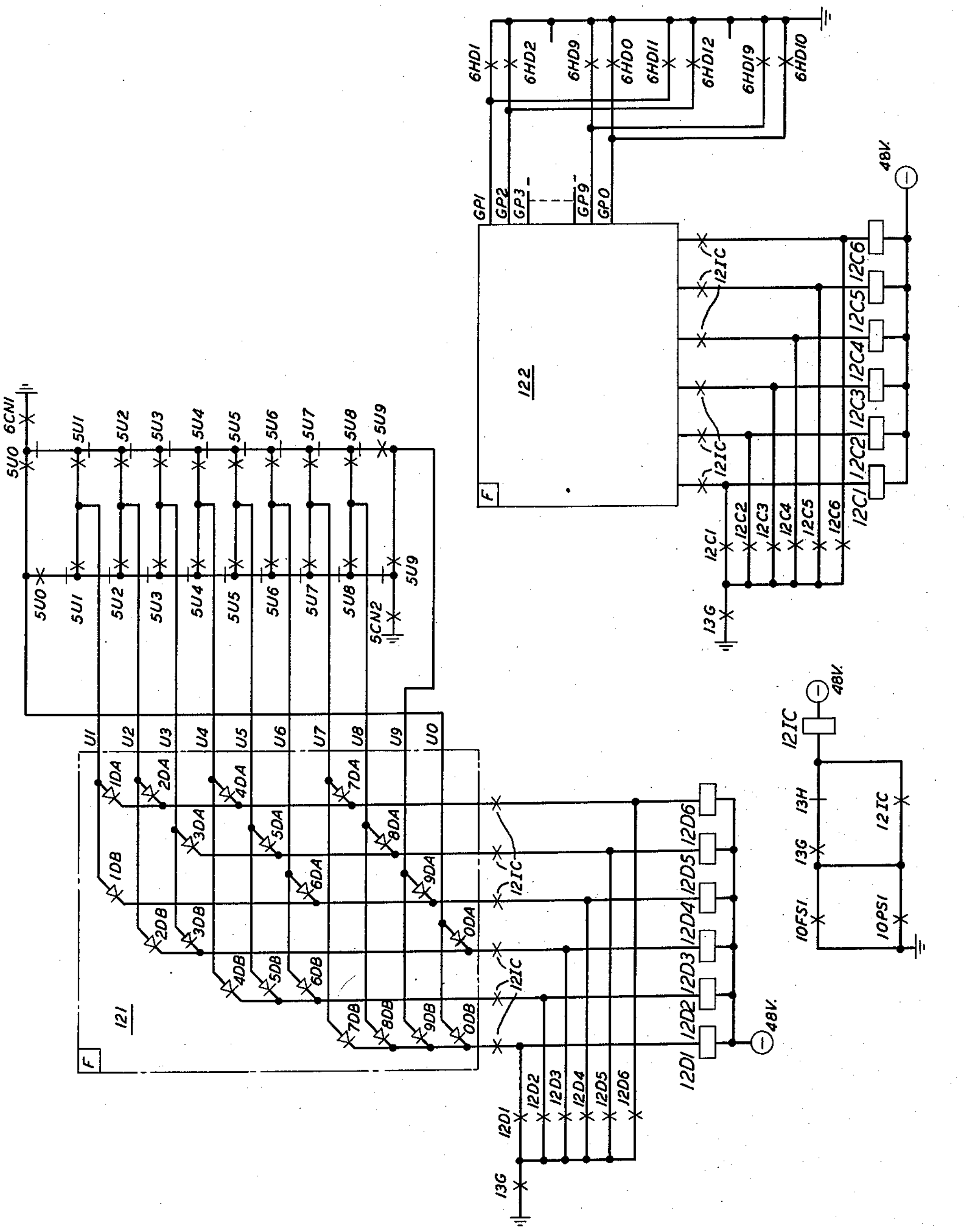
Figure 13:
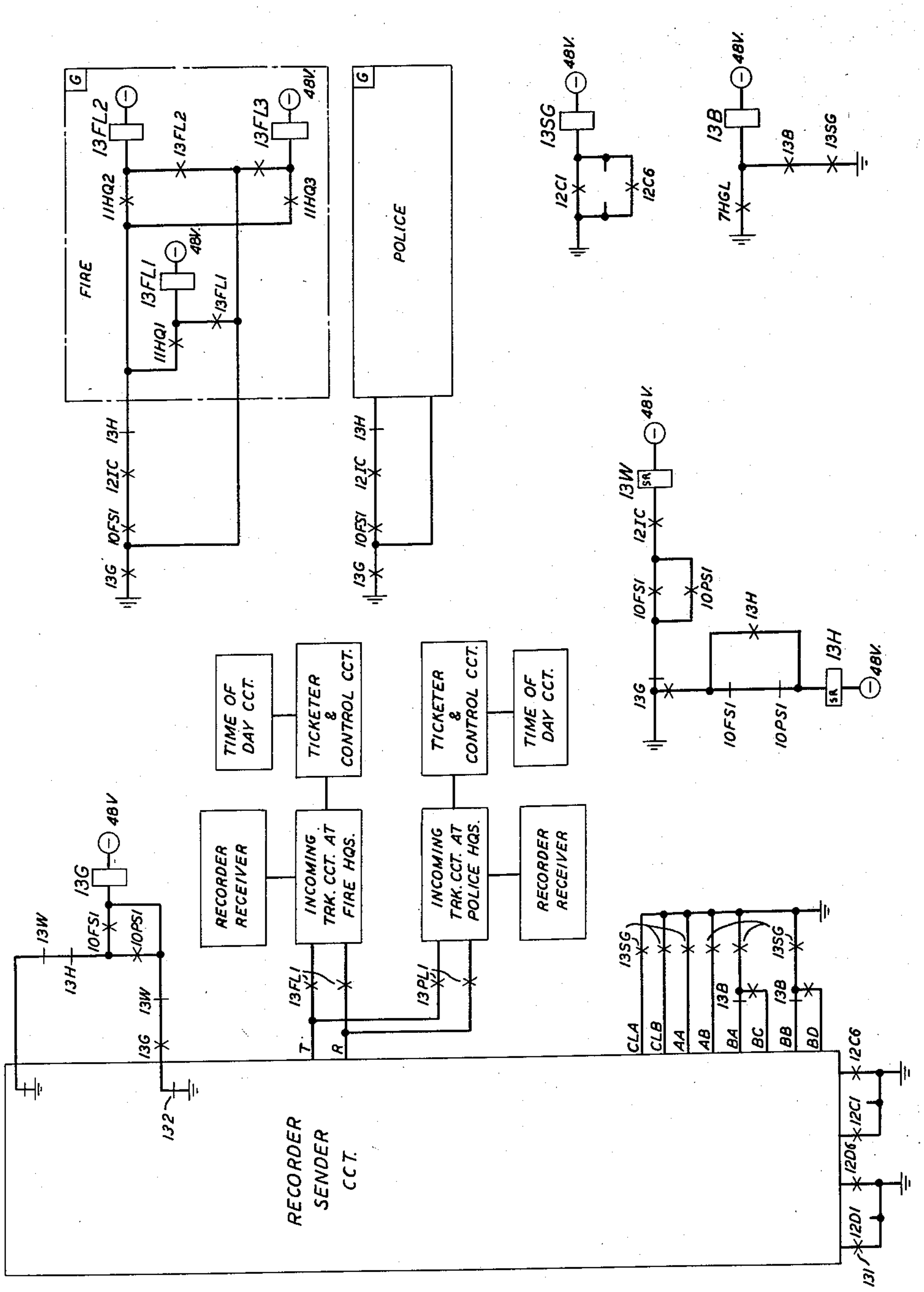
Figure 14:
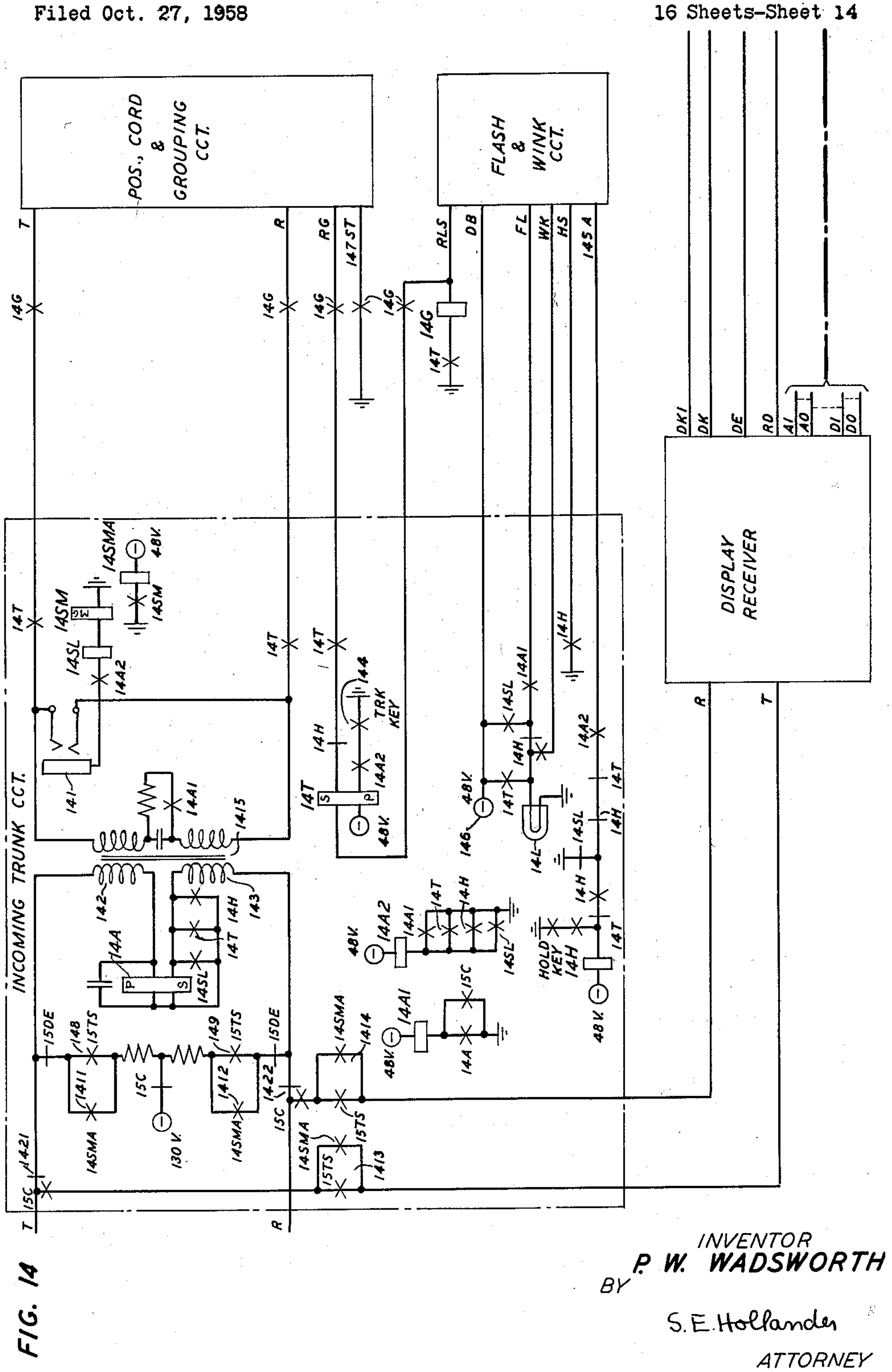
Figure 15:
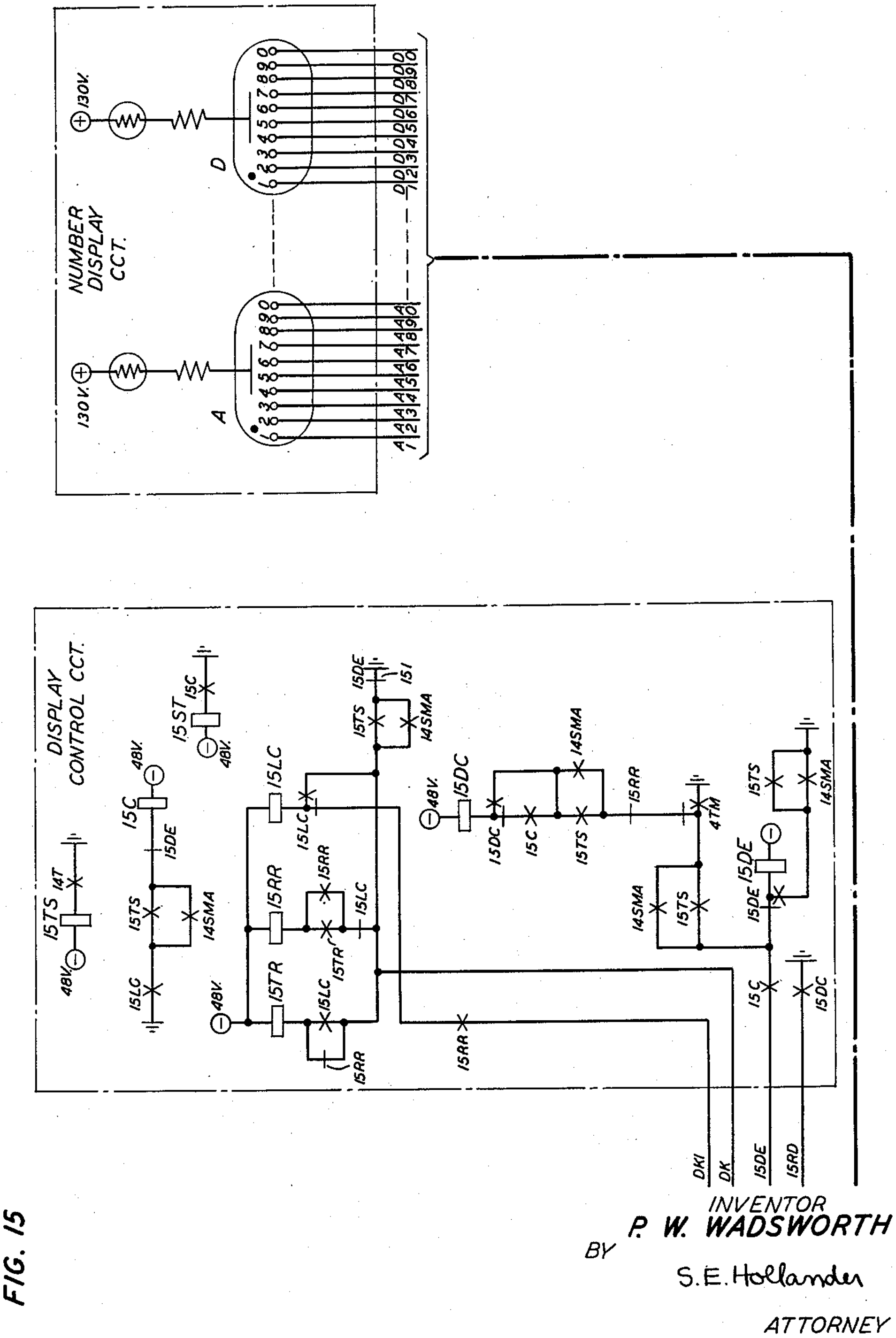
Figure 17:
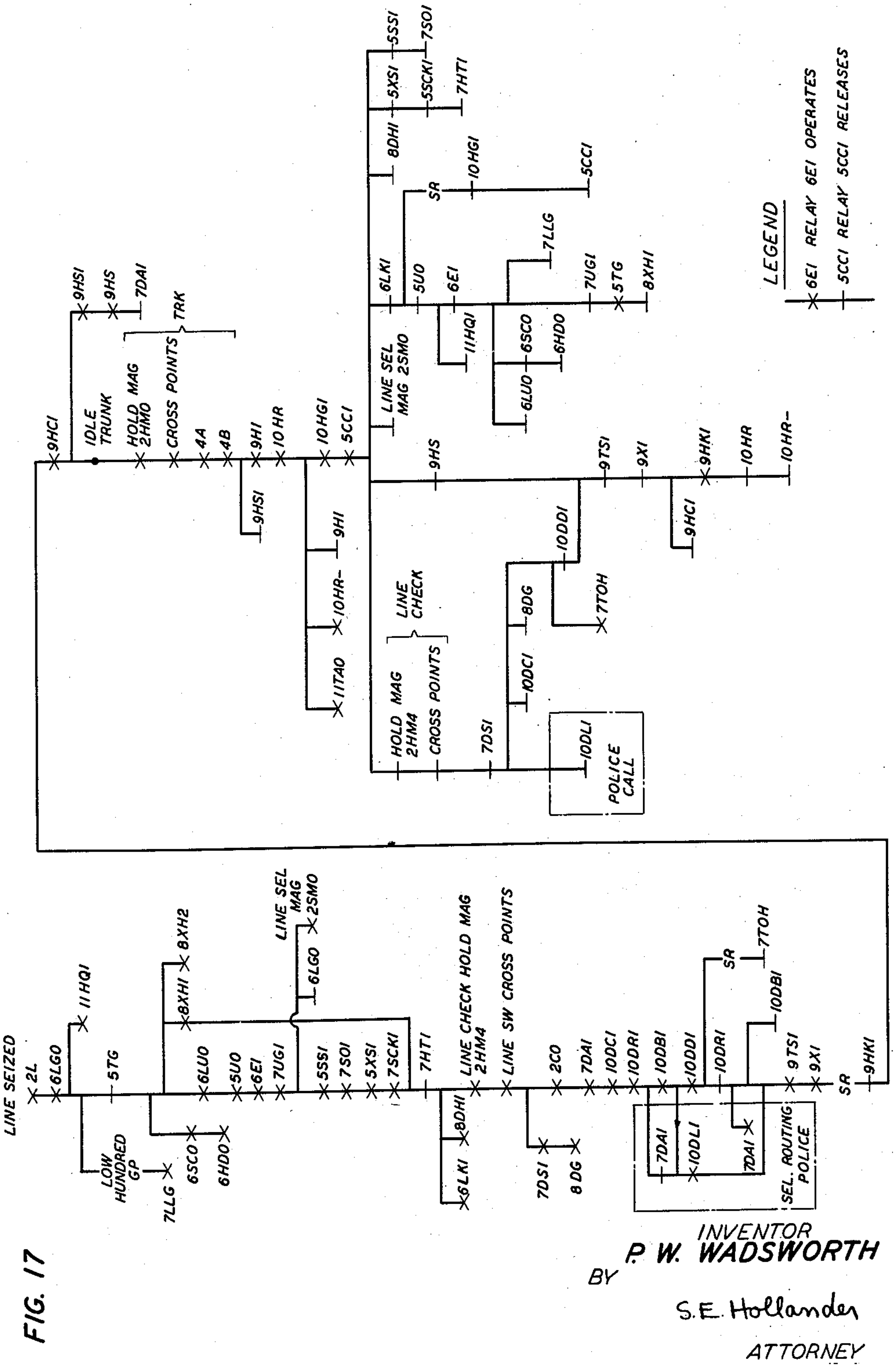

Fig. 4 includes portions of the outgoing trunk circuit;

Figs. 5 and 6 include the line selection circuit of the controller;

Fig. 7 includes portions of the line control circuit of the controller and the line check and selective routing circuit of the controller;

Fig. 8 represents the outgoing trunk selection control circuit of the controller;

Figs. 9 and 10 depict the fire trunk selection control circuit and the police trunk selection control circuit;

Fig. 11 includes the outgoing trunk chain control and trunk relays of the controller;

Figs. 12 and 13 show the recorder sender control circuit of the controller and (symbolically) the associated equipment at the central office including the recorder receiver, ticketer and control circuit and time-of-day circuit;

Fig. 14 includes the incoming trunk circuit at emergency service headquarters;

Fig. 15 includes the display control circuit and number display circuit associated with the incoming trunk circuit of Fig. 14;

Fig. 16 discloses the manner in which Figs. 2–15 may be advantageously disposed to illustrate the instant invention; and Fig. 17 is a chart depicting the time sequence of operation of certain relays in the controller circuit.

It will be noted that Figs. 2–15 employ a type of notation referred to as "detached contact" in which a line perpendicular to the circuit represents normally closed contacts and an "X" represents normally open contacts, "normally" referring to the unoperated condition of a relay or other contact controlling device. For a complete exposition of this type of notation, reference may be made to an article entitled "Improved Detached Contact Circuit Drawing" by F. T. Meyer, volume 74, Electrical Engineering, page 645, August 1955.

It will also be noted that the reference designations indicate in each instance the number of the figure on which the relay or other contact controlling device is located. For example, a reference to the contacts of relay 6E1 indicates that the relay having a functional designation E1 is located on Fig. 6. The contacts of relay 6E1, although shown in some instances on figures other than 6, carry only the reference designation of the relay, i.e., 6E1. Except for a small number of instances in which clarity of circuit description dictated special reference designations for relay contacts, all of the contacts have been designated only by reference to the associated relay designation.

*General description*

Referring to the outline diagram of Fig. 1, it is seen that the emergency reporting system includes a number of remotely situated emergency reporting substations. A conventional telephone transmitter receiver apparatus and a selecting device for routing a call to either fire or police headquarters are located in each substation. Conductor pairs from each emergency substation are extended to concentrating equipment in a telephone central office. From the central office, connections originating at the substations are extended over a number of trunks, substantially less in number than the number of lines, to the desired headquarters destination.

When a service request is initiated, lifting of the handset at the substation signals the switchboard operator at fire headquarters.

If the request is intended for police headquarters a selective routing switch is depressed before the handset is lifted and the call is directed to the police switchboard. When the police call is completed the line automatically returns to a condition which will direct the following call to fire headquarters unless the selective routing switch is depressed.

Automatic apparatus connected to the line at the central office is energized when the line relay operates in response to a service request. A controller circuit associates itself with the vertical of a crossbar switch in the line and switch circuit on which the calling substation circuit appears as a horizontal multiple.

Identification is provided to the controller by a mark on two conductors from a line circuit individual to the calling substation. One of the marks identifies a particular group of ten lines and the other is a units designation. When the controller effects the connection between the line and the controller circuit through the operation of a hold magnet in a crossbar switch, supervision of the call is transferred to the controller.

A test is made to establish the destination (fire or police headquarters) sought by the calling party. A diode connected at the calling station is normally short-circuited but the short circuit is removed, if the call is for police headquarters, through the depression of a routing switch. The controller, as part of its route determination test, reverses battery and ground on the loop to the calling substation. If the diode is effectively connected in the circuit in consequence of the removal of the short circuit thereacross, a change in loop current is sensed by the controller. When there is no loop current change, the controller prepares to forward the call to fire headquarters.

An idle outgoing trunk in the desired outgoing trunk group is connected to the calling line by the controller. Supervision of the connection now passes to the outgoing trunk circuit and the connection between the line circuit and the controller is released. Relays are energized in the outgoing trunk circuit which forward a seizure signal to the headquarters incoming trunk circuit.

When the operator answers the call at headquarters, a talking circuit is completed to the operator's position circuit and, in the process of answering, a signal is returned over the trunk loop conductor to the outgoing trunk circuit in the central office as an identification request. This results in the operation of an identification relay in the line circuit which supplies identification information to a display sender circuit. At the headquarters a display receiver circuit is connected to the incoming trunk to receive information transmitted by the sender. The sender pulses the directory number of the calling line over the talking path to the receiver which, in turn, translates it into signals which are displayed on cold cathode number display indicating tubes.

Corresponding information relating to the equipment number of the calling line is transmitted by the controller to a recorder sender which sends it to a recorder receiver through an incoming trunk circuit. A record is printed by the ticketer and control circuit at the headquarters location indicating the equipment number of the line requesting service and time of such request. When the operator disconnects from the talking connection all circuits are restored to normal. A flexible arrangement permits an operator to place a calling trunk in the hold condition to permit servicing a new call. When the operator returns to the held call, a new number display request is transmitted over the trunk from the headquarters location and the number is again displayed to the operator.

To facilitate the explanation of the instant invention a number of apparatus assemblies, the details of which are not essential to an understanding of the present invention, have been shown symbolically. These include the sender and receiver circuits (display and recorder). For a comprehensive description of an illustrative sender and receiver circuit for use with the instant invention, reference may be made to an application of T. L. Dimond et al., Serial No. 560,160, filed January 19, 1956.

The flash and wink circuit and position cord and grouping circuit may illustratively take the form shown in Patent No. 2,816,958, December 17, 1957 of P. W. Wadsworth. Similar reference designations have been employed in the instant arrangement to facilitate cross reference.

Suitable facilities for automatic equipment number recording including the ticketer and control circuit and time-of-day circuit are illustrated in Patent No. 2,889,402, June 2, 1959, of F. M. Pearsall, Jr. now Patent No. 2,889,402, and the patents therein referred to.

*Detailed description*

*Line and switch circuit*

All of the emergency substations have an associated substation line circuit located at the remote end of the line loop in a telephone central office. Ten lines having access to the same outgoing trunks to fire or police headquarters constitute a line group. The line circuits of a group are associated with the horizontal levels of a crossbar switch unit. Vertical levels on the crossbar switch are connected to outgoing trunks which extend to appropriate emergency service headquarters.

Figure 2:
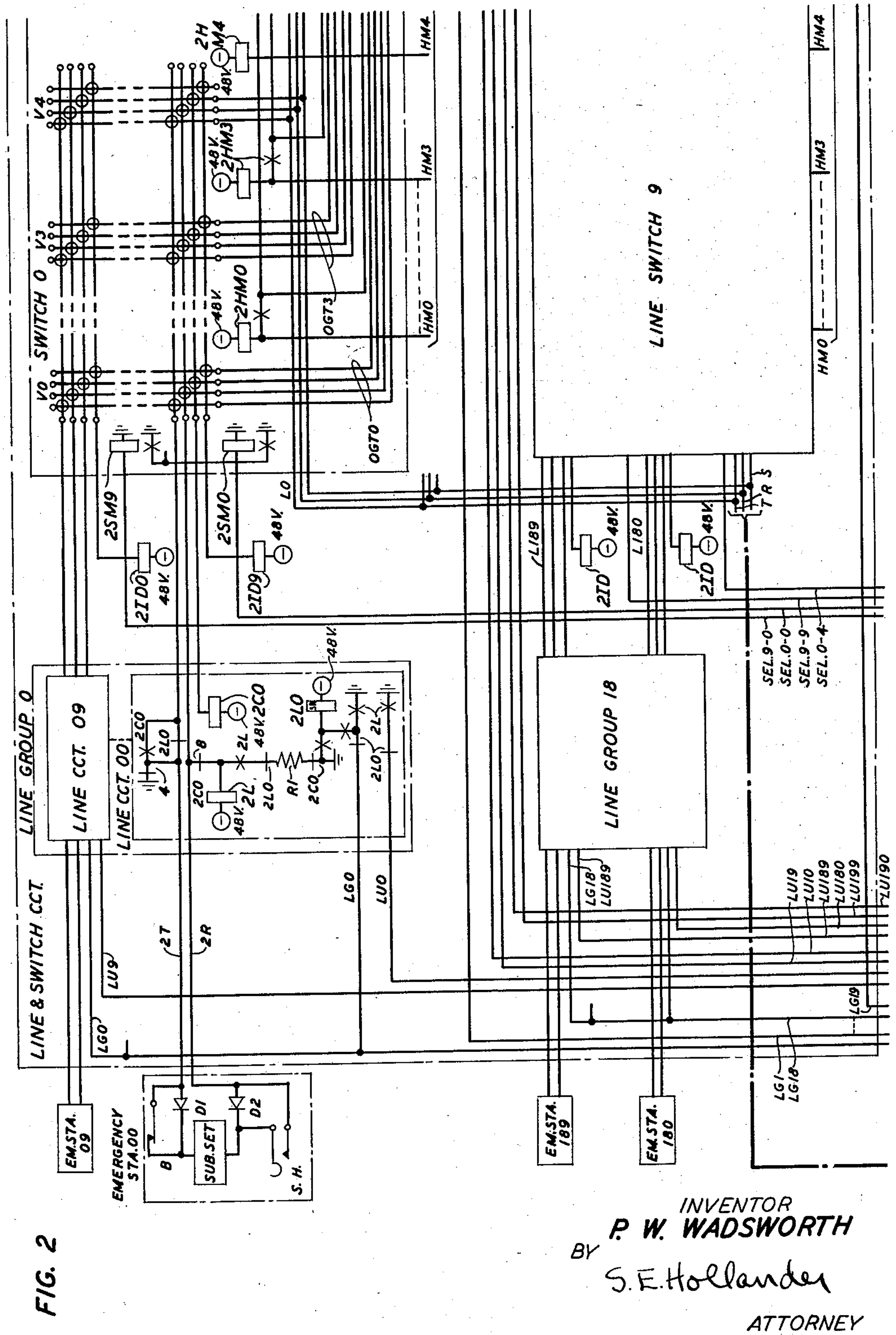
Figs. 2 and 3 represent part of the line and switch circuits.

In Fig. 2, ten lines L0–L9 (of which only two are shown) extending from emergency stations 00–09 constitute line group 0. Line group 18, shown in outline form, is similar to line group 0 and includes lines extending from emergency stations 180-189. Illustratively, a line and switch circuit can include 200 lines or 20 line groups of which only two are shown in Fig. 2. In switch 0, shown in Fig. 2, line group 0 including lines L0–L9, has access to four outgoing trunks 0GT0–0GT3, of which only two trunks are shown.

Figure 3:
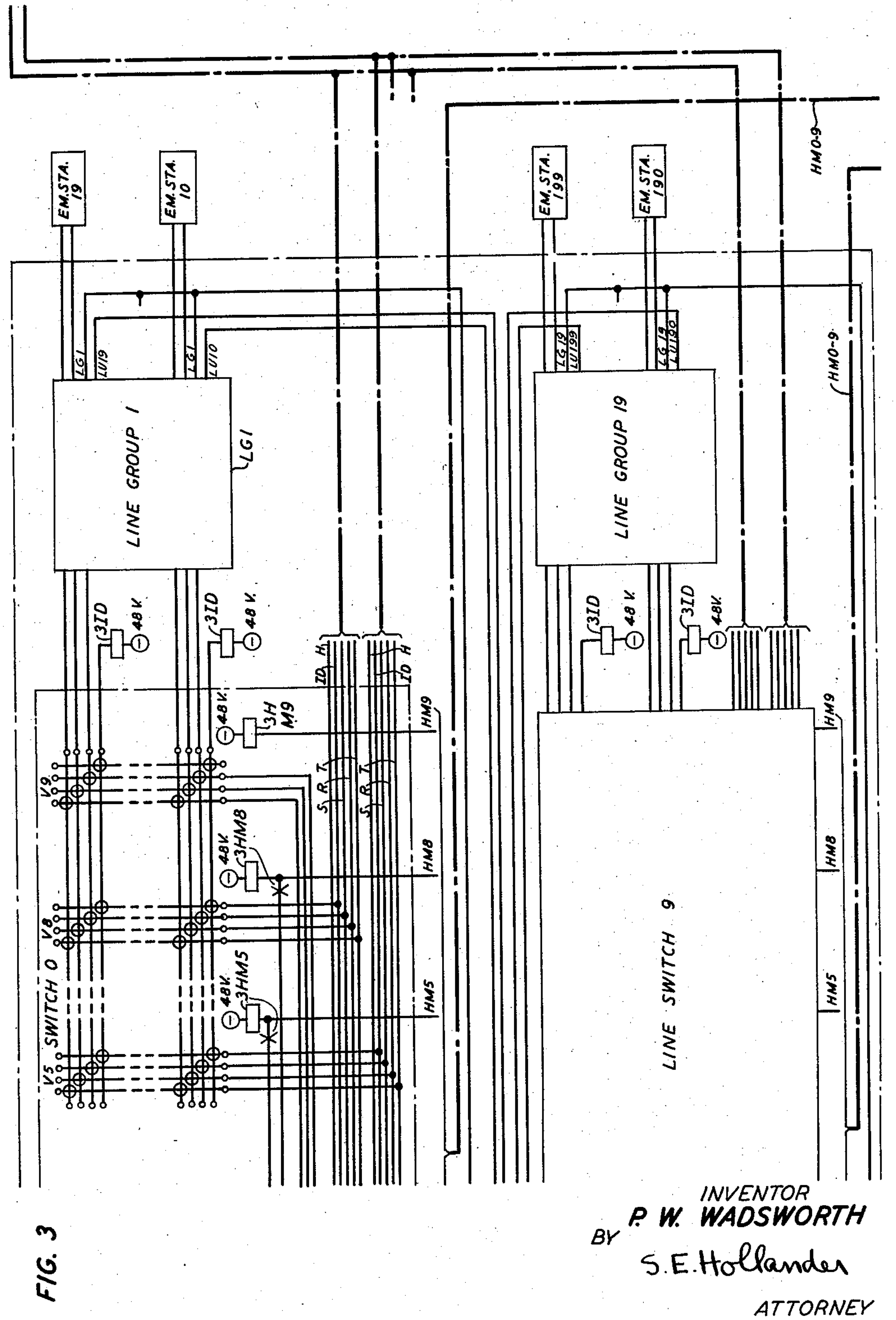

In the illustrative embodiment shown in Figs. 2 and 3, two line group LG0 and LG1 are associated with switch unit 0. One line group LG0 is associated with the horizontals having crosspoints at verticals V0–V4 and the other line group LG1 of Fig. 3 is associated with the horizontals having crosspoints at verticals V0-V4 and the other line group LG1 of Fig. 3 is associated with the horizontals having crosspoints at verticals V5–V9. Outgoing trunk circuits 0GT0–0GT3 are multipled to verticals V0–V3 and V5–V8, respectively. Verticals V4 and V9 are joined to provide communication between the line circuits and the controller circuit (Fig. 7).

When emergency station 00 is in the on-hook position a diode D2 (Fig. 2) is connected in the non-conducting direction to prevent operation of line relay L. When the handset at the station is lifted, diode D2 is shorted through the switchhook contacts SH and relay 2L operates from ground, contacts 4 of relay 2C0 over the tip conductor 2T, closed contacts B of the routing button (whose function will be explained herein), the closed switchhook contacts SH, contacts 8 of relay 2C0, winding of relay 2L to negative battery.

Relay 2L locks to ground over the contacts of relay 2C0, resistance R1, contacts of relay 2L0, contacts of relay 2L, winding of relay 2L to negative battery.

Ground is connected to lead LG0 over the normally open contacts of relay 2L, normally closed contacts of relay 2L0 and ground potential is connected to lead LU0 over the normally open contacts of relay 2L and the normally closed contacts of relay 2L0.

Lead LG0 identifies the tens digit of the calling station circuit as 0 and lead LU0 indicates that the units designation of the calling station is 0. Physically, the calling line appears on the lowest level of crossbar switch 0 to which the station circuit is connected.

The controller is informed from the energized LG0 and LU0 leads which line circuit is requesting service, the location of the crossbar switch associated with the line group that the calling station is in and the switch level in which the particular calling subset is located. The controller connects itself to the correct set of crosspoints in the crossbar switch by operating the select and hold magnets associated therewith. When the line is connected to the controller a ground condition is returned on lead S to operate cut-off relay 2C0. The cut-off relay 2C0 removes line circuit battery and ground from the calling line and operates lockout relay 2L0, as explained in detail herein. The latter relay prevents reseizure of the controller if the answering operator releases the connection before the calling station disconnects. The controller ascertains the route desired by the calling station, seizes an outgoing trunk in the appropriate group, closes the switch crosspoints to the selected trunk and releases the crosspoints connecting the controller to the calling line.

When the call is answered, as explained herein, ground from the outgoing trunk on lead ID operates identification relay 2ID. The identification relay contacts are closed to transfer the number of the calling emergency substation to a sender (shown in outline form in Fig. 4) which transmits it to the answering location for visual display for the operator.

*Controller*

Before proceeding to the detailed operation of the controller (a comprehension of which will be facilitated by appropriate reference to Fig. 17), it should be noted that the following relays are normally operated when the controller is idle: relays 9DF2, 8FDF, 9HK1, 7HT1, 7HT2, 5TG, 10TI, 7TO and 7TOH. It will be assumed in this description that the preferred direction of line and trunk selection will be from lower numbered to higher numbered lines and trunks and thus relays 6CN1, 11RWA and 11TL are operated.

As indicated above, a ground condition is impressed on lead LG0 by the operation of relay 2L in line circuit 00 of line group 0. This ground condition results in the operation of relay 6LG0 over a path including ground, contacts of relay 2L, contacts of relay 2L0, lead LG0, winding of relay 6LG0, contacts of relay 6SC0, contacts of relay 6LG0, contacts of relay 5TG to negative battery. Relay 6LG0, in operating, establishes a path over its normally open contacts to negative battery 60.

The operation of relay 6LG0:

(1) opens the operating path to relay 5TG to prevent the subsequent operation of any other relays 6LG– while a call is being put through. If simultaneous calls are originated in different line groups, relays 6LG– of each line group in which a call is originated will operate;

(2) operates relay 11HQ1 preparing the trunk hold magnet path for selecting the trunk to the headquarters to which lines of the associated group are normally routed; and (3) operates relay 7LLG inasmuch as the line requesting service is in a low tens group (LG0–LG9). If the line was in a high tens group (LG10–LG19), relay 7HLG would have been operated.

Since the lines in line group LG0 are normally routed to fire headquarters HQ1, five headquarters relay 11HQ1 is operated over a path including ground, contacts of relay 6LG0, winding of five headquarters relay 11HQ1 to negative battery.

Relay 5TG is released through the opening of the normally closed contacts of relay 6LG0 in series with the operating path thereof. Relay 7LLG is operated over a path from ground, contacts of relay 6LG0, winding of relay 7LLG, contacts of relay 7HLG to negative battery.

The release of relay 5TG closes the operating path for relays 6LU0 and 6SC0. This path may be traced from negative battery, resistance 6CN10, contacts of relay 6CN1, in parallel through the windings of relays 6LU0 and 6SC0, normally open contacts of relay 6LG0, contacts of relay 7LLG, contacts of relay 7HLG, contacts of relay 10HG1, contacts of relay 5TG, contacts of relay 6AW, contacts of relay 6E1, contacts of relay 5FE to ground.

Relay 5TG, in releasing, extends battery and ground to the circuit of relays 8XH1 and 8XH2 which operate. The operating path for the latter relays may be traced from ground, contacts of relay 5TG, resistance 8J, winding of relay 8XH1, resistance 8G, to negative battery. A similar circuit may be traced for the operation of relay 8XH2.

The operation of relay 6SC0 results in the operation of relay 6HD0 over the path previously traced for the operation of relay 6SC0, winding of relay 6HD0, normally open contacts of relay 6SC0 to ground. A path for the operation of select magnet 2SM0 on switch 0 is prepared by the closing of the contacts of relay 6SC0 in series with lead SEL0.

Operation of relay 6HD0 prepares a path to hold magnet 2HM4 on switch 0 through the closure of the contacts of relay 6HD0 in series with conductor HM4 (Fig. 8).

The operation of relay 6LU0 closes ten LU– leads from selected line group LG0 to the windings of the relays 5U0–5U9. Ground on lead LU0 from line circuit 00 operates relay 5U0 over a path including negative battery, contacts of relay 7UG2, contacts of relay 7UG1, contacts of relay 5U0, winding of relay 5U0, contacts of relay 6LU0, lead LU0, contacts of relay 2L0, contacts of relay 2L to ground.

Relay 6E1 operates over a circuit which may be traced from negative battery, contacts of relays 6AW, winding of relay 6E1, contacts of relay 5U0, contacts of relay 7HLG, contacts of relay 7LLG, contacts of relay 6LU9, contacts of intermediate relays 6LU–, contacts of relay 6LU0, contacts of relay 6LG0, contacts of relay 7LLG, contacts of relay 7HLG, contacts of relay 10HG1, contacts of relay 5TG, contacts of relay 6AW, contacts of relay 6E1, contacts of relay 5FE to ground. Relay 6E1 locks operated over the contacts of relay 5U0, contacts 61 of relay 6E1, contacts of relay 5FE to ground. Operation of relay 6E1 results in the operation of relay 7UG1, over an obvious path including the contacts of relay 6E1.

A path has now been prepared for the operation of select magnet 2SM0 in switch unit 0 over a path which may be traced from ground, select magnet 2SM0, lead SEL0, contacts of relay 6SC0, contacts of relay 5U0, contacts of relay 6CN1, winding of relay 5SS1, winding P of relay 5XS1, contacts of relay 5CC1, contacts of relay 7UP1, resistance 5S1 to negative battery.

The operation of relay 7UG1 also:

(1) releases relay 6LG0;

(2) maintains the operate path of relay 5TG open to prevent operation of other relays 6LG–;

(3) opens the operate path of relay 5U– to prevent another relay 5U– in the same line group from operating.

The operation of relay 6E1, previously described, closes battery and ground through the winding of relay 8XH1 to the hold magnet 2HM4 of switch 0 over the contacts of relay 7HT1, contacts of relay 5CC1, contacts of relay 6E1, contacts of relay 6HD0 and lead HM4.

Relay 6LG0 releases through the opening of the contacts of relay 7UG1 in series therewith. The operate path to relay 5TG is held open by the contacts of relay 7UG1 in series therewith. The contacts of relay 7UG1 in series with relays 5U0–5U9 prevent the operation of any other relay 5U– in response to a request for service from another line in the same group. The contacts of relay 7UG1 also connect battery through resistance 5S1 to the windings of relays 5XS1 and 5SS1.

*Hold magnet and select magnet check*

Before the line switch crosspoints are closed both the select and hold magnets are checked for cross-connections. When relay 6E1 operates to close a path to relay 8XH1 and hold magnet 2HM4, current through the hold magnet develops a potential drop across resistance 8J thereby lowering the voltage across the winding of relay 8XH1. Relay 8XH1 is designed so that it will not release in consequence of the voltage across resistance 8J due to one hold magnet, but if two hold magnets are connected relay 8XH1 releases and prevents closure of the crosspoints by preventing release of relay 7HT1 (as explained herein).

It will be noted that hold magnet 2HM4, although energized, does not operate at this time in view of the relatively high impedance in the operating path thereof (resistance 8J).

When relay 7UG1 operates, select magnet 2SM0 and relay 5SS1 operate over a path including negative battery, resistance 5S1, contacts of relay 7UG1, contacts of relay 5CC1, winding P of relay 5XS1, winding of relay 5SS1, contacts of relay 6CN1, contacts of relay 5U0, contacts of relay 6SC0, to select magnet 2SM0. Relay 7SO1 operates in consequence of the operation of relay 5SS1 over an obvious path including the contacts of relay 5SS1. Relay 7SO1 locks to ground over the contacts of relay 7SO1, contacts of relay 6E1 and contacts of relay 5CC1.

Relay 7SO1, in operating, places a ground condition on winding S of relay 5XS1 over the contacts of relay 7SO1 and resistance 5E. Relay 5XS1 operates if only one select magnet is connected to winding P but if more than one select magnet is connected the increased current in winding P keeps relay 5XS1 from operating and the crosspoints will not be closed since relay 7HT1 does not release (as explained herein).

*Connection of line to controller*

When relay 5XS1 operates as an indication of proper conditioning of the select magnet circuit, relay 7SCK1 operates over the contacts of relay 5XS1. Operation of relay 7SCK1 results in the removal of ground condition from the winding of relay 7HT1 at the normally closed contacts of relay 7SCK1. Ground nevertheless remains on the winding of relay 7HT1 through the normally closed contacts of relay 8XH1. Thus, collective operation of relays 7SCK1 and 8XH1 effects the release of relay 7HT1. In releasing, relay 7HT1 results in the operation of hold magnet 2HM4 over a path including negative battery, winding of hold magnet 2HM4, conductor HM4, contacts of relay 6HD0, contacts of relay 6E1, contacts of relay 5CC1, contacts of relay 7HT1, winding of relay 8DH1 to ground. Relay 8DH1 and hold magnet 2HM4 operate in series.

Relay 6LK1 operates over a path including ground, contacts of relay 7HT1, contacts of relay 6E1, winding of relay 6LK1, contacts of relay 5CC1, resistance 6D to negative battery. Operation of relay 6LK1 holds relay 5U0 operated over the contacts of relay 6LK1. With the select magnet 2SM0 previously operated and hold magnet 2HM4 operated, the crosspoints are closed and leads T, R and S of the calling line are closed through to the line check and selective routing circuit of the controller (Fig. 7).

*Line check and selective routing*

After the switch crosspoints are closed, relay 7DS1 operates over a path including ground, winding of relay 7DS1, contacts of relay 9DF1, sleeve conductor S, winding of relay 2C0 to negative battery. Relay 2C0 is also operated at this time. Operation of relay 2C0 opens both the operate and hold paths of relay 2L which releases and operates relay 2L0 over a path including ground, contacts of relay 2C0, winding of relay 2L0 to negative battery.

Operation of relay 7DS1 results in the operation of relay 8DG over a path including contacts of relay 7DS1, winding of relay 8DG to negative battery. Operation of relay 2C0 in the line circuit causes the operation of relay 7DA1 over a path including ground, upper winding of relay 7DA1, contacts of relay 10DR1, contacts of relay 9DF1, contacts of relay 9HS, crosspoint contacts, contacts of relay 2C0, loop conductor 2T, substation 00, loop conductor 2R, crosspoint contacts, contacts of relay 9HS, contacts of relay 9DF1, contacts of relay 10DR1, lower winding of relay 7DA1 to negative battery.

Since the operation of relay 2CO removes line circuit battery and ground from the calling line at the contacts 8 and 4 of relay 2C0, relay 7DA1 no longer has equal potentials across the upper and lower windings and operates.

The operation of relay 7DA1 results in the operation of relay 10DC1 over a path including negative battery, winding of relay 10DC1, contacts of relay 10DC1, contacts of relay 7DA1, contacts of relay 7DS1, to ground. Relay 10DC1 locks operated over its normally open contacts and the contacts of relay 7DS1.

Relay 10DR1 now operates over a path including ground, contacts of relay 10DD1, contacts of relay 10DC1, winding of relay 10DR1 to negative battery.

Relay 10DR1, in operating, reverses battery and ground connected to the station loop and operates relay 10DB1. A reversal of the polarity to the substation is effected by the operation of contacts 72 and 74 and the release of contacts 71 and 73 of relay 10DR1 in the circuitry connected to the windings of relay 7DA1.

Relay 10DB1 operates over a path including ground, contacts of relay 10DR1, winding of relay 10DB1 to negative battery. Relay 10DD1 operates from ground, contacts of relay 10DB1, contacts of relay 10DD1, winding of relay 10DD1 to negative battery and locks operated over the contacts of relay 7DS1.

It will be seen that if the police routing key B at the subset is not operated, no change in loop current is occasioned since the routing key B by-passes diode D1 and switchhook contacts SH by-pass diode D2. If, however, the calling party wishes to effect a connection to police headquarters and has depressed the police routing key, diode D1 is no longer by-passed and the loop current is substantially cut off.

If it is assumed that the call is for police headquarters the change in loop current, effected as explained above, results in the release of relay 7DA1 and the operation of relay 10DL1 over a path including ground, contacts of relay 7DS1, contacts of relay 7DA1, contacts of relay 10DR1, contacts of relay 10DB1, winding of relay 10DL1 to negative battery. Relay 10DL1 locks operated over a path including contacts of relay 10DL1, contacts of relay 10DD1 and the contacts of relay 7DS1.

With relay 10DL1 operated, the normally open contacts of relay 10DL1 extend a ground condition from the contacts of relays 10DR1 and 10DD1 to lead P1 (Fig. 10) to the police trunk selection control circuit (Fig. 9) when relay 10DR1 releases, as explained herein.

If the call is intended for fire headquarters, operation of relay 10DB1 causes the operation of relay 10DD1, as explained above.

The operation of relay 10DD1:

(1) releases relay 7TOH;
(2) holds relay 8FDF operated; and
(3) releases relay 10DR1.

Relay 7TOH was previously operated over a patn including ground, contacts of relay 10DD1, contacts of relay 10DD2, contacts of relay 9DF2, winding of relay 7TOH to negative battery. Relay 7TOH releases as a result of the opening of the contacts of relay 10DD1.

Relay 10DR1 releases in consequence of the opening of the normally closed contacts of relay 10DD1 in series therewith.

Relay 10DB1 releases in consequence of the opening of the contacts of relay 10DR1 in series therewith.

Relay 7DA1 now reoperates if previously released on line reversal to indicate a call for police headquarters. The release of relay 10DR1 also connects ground to the outtrunk selection control circuit of lead F1 (Fig. 10) if relay 10DL1 has not operated and on lead P1 if relay 10DL1 is operated. If relay 10DL1 is not operated, ground is connected over the contacts of relay 10DR1, contacts of relay 10DD1, normally closed contacts of relay 10DL1 to lead F1 in the fire trunk selection control circuit.

*Trunk selection*

A ground condition on lead F1 from the line check and selective routing circuit, as explained above, operates relay 9TS1 over a path including negative battery, winding of relay 9TS1, contacts of relay 9TS2, contacts of relay 10FF0, conductor F1, contacts of relay 10DL1, contacts of relay 10DD1, contacts of relay 10DR1 to ground. Operation of relay 9TS1 connects battery and ground to a bridge circuit including relay 9X1 and a path to the hold magnet 2HM0 or 2HM1.

The path of the hold magnet 2HM0, for example, is from negative battery, hold magnet 2HM0, conductor HM0, contacts of relay 6HD0, contacts of relay 11TO, contacts of relay 11HQ1, contacts of relay 11RWB, contacts of relay 5STF, lead 1HM, contacts of relay 10HR, contacts of relay 9HC1, resistance 9B1, contacts of relay 9TS1 to ground.

Relay 9X1 checks for a cross-connection on the trunk hold magnet conductor in a manner similar to that explained previously for the hold magnet check by relay 8XH1. If one hold magnet is connected, relay 9X1 operates. If more than one hold magnet is connected to the bridge circuit, relay 9X1 does not operate and the crosspoints are prevented from closing.

The operation of relay 9X1 over the path previously traced for the operation of hold magnet 2HM0 releases relay 9HK1 which closes a path for operating relay 9HC1.

Relay 9HK1 releases in consequence of the opening of the contacts of relay 9X1 in series therewith. Relay 9HK1 is slow releasing to prevent operation of the trunk hold magnet if relay 9X1 should falsely operate from a current surge when relay 9TS1 operates.

Relay 9HC1 operates over a path including ground, contacts of relay 9X1, contacts of relay 9HK1, winding of relay 9HC1 to negative battery. The operation of relay 9HC1 transfers the hold magnet THM0 from the relay 9X1 bridge circuit to a low resistance ground through the windings of relays 9H1 and 9HS1 over the path previously traced and resistance 9D1.

Hold magnet 2HM0 operates connecting the calling line to the selected outgoing trunk 0GT0. Relays 9HS1 and 9H1 are oppositely poled and relay 9HS1 operates at this time in series with the hold magnet.

The operation of relay 9HS1 results in the operation of relay 9HS over a path including ground, contacts of relay 9HS1, winding of relay 9HS to negative battery. Relay 9HS locks operated over its own contacts and the contacts of relays 5CC1 and 5CC2.

The operation of relay 9HS opens the tip and ring leads T and R to relay 7DA1 in consequence of the opening of the contacts of relay 9HS in series therewith. Relay 7DA1 releases and battery and ground are supplied to the station loop through the connected outgoing trunk supervisory relay 4A. Relay 4A in the trunk circuit operates over conductors T and R from line and switch circuit to battery and ground at windings P and S of relay 4A, respectively. Relay 4B operates in consequence of the operation of relay 4A over a circuit including ground, contacts of relay 4A, winding of relay 4B to negative battery. Relay 4B locks operated over its own contacts, contacts of relay 4D and contacts of relay 4C to ground.

*Release of controller*

When the outgoing trunk circuit assumes control of the connection by applying ground to hold magnet 2HM0, the current through relays 9HS1 and 9H1 is reversed since the current is now from the trunk ground (Fig. 4), contacts of relays 4D, 4B and 4C, lead H, contacts of magnet 2HM0, the path traced above and through the relays 9HS1 and 9H1 to negative battery. Relay 9HS1 releases and relay 9H1 operates, in turn operating relay 10HR over a path including ground, contacts of relay 9H1, winding of relay 10HR to negative battery. Relay 10HR locks operated over its own contacts and the contacts of relay 9HK1. The operation of relay 10HR:

(1) operates additional relays 10HR for each trunk group associated with the controller over the contacts of relay 10HR;

(2) opens the trunk hold magnet lead 1HM and releases relay 9H1;

(3) closes the path from the outgoing trunk lead TA0 (Fig. 11) to the primary winding of the associated relay 11T0; and (4) operates relay 10HG1 through the contacts of relays 7UG1 and 6LK1.

Relay 10HG1 operates over a path including battery, winding of relay 10HG1, contacts of relay 6LK1, contacts of relay 7UG1, contacts of relay 10HR to ground.

Ground from the selected trunk on lead TA0 (Fig. 11) over the contacts of relay 4B operates relay 11T0 which locks operated over its own contacts and the contacts of relay 11TF to ground. The outgoing trunk hold magnet path is now transferred to the next idle trunk 0GT1 in the group through the operation of contacts 81—82 of Fig. 8.

The operation of relay 10HG1 operates relay 5CC1 over a path including negative battery, winding of relay 5CC1, contacts of relay 5F1, contacts of relay 10HG1 to ground.

Operation of relay 5CC1:

(1) opens the select magnet path to release the select magnet 2SM0 and relays 5SS1 and 5XS1;

(2) releases the line check hold magnet 2HM4 and relay 8DH1;

(3) releases relay 6LK1; and (4) releases relay 9HS all through the opening of the contacts of relay 5CC1 in series therewith.

Relay 5SS1 in releasing releases relay 7SO1 through the opening of the contacts of relay 5SS1. The release of relay 5XS1 releases relay 7SCK1 through the opening of the contacts of relay 5XS1. Relay 7HT1 operates in consequence of the release of relay 7SCK1 over an obvious circuit.

The release of relay 9HS removes a holding ground from relay 9TS1 over the contacts of relays 9TS1 and 10FF0 and the release of line check hold magnet 2HM4 opens the crosspoints in vertical V4 and relay 7DS1 releases.

Release of relay 7DS1 releases relay 10DC1 through the opening of the contacts of relay 7DS1 in series therewith. Relay 8DG releases through the opening of the contacts of relay 7DS1 in series therewith. Relay 10DD1 also releases through the opening of the contacts of relay 7DS1. Relay 7TOH operates over the normally closed contacts of relay 10DD1, contacts of relay 10DD2, contacts of relay 9DF2, winding of relay 7TOH to negative battery.

Relay 6LK1 releases through the opening of the contacts of relay 5CC1 and in turn releases relay 5U0. The release of relay 6LK1 also releases relay 10HG1 at the contacts of relay 6LK1. Relay 5CC1 releases in consequence of the interruption of its holding path through the contacts of relay 10HG1. Relay 10HG1 is slow in releasing to hold relay 5CC1 operated for sufficient time to allow the controller to prepare for serving the next call.

Release of relay 5U0 results in the release of relay 6E1 in consequence of the opening of the contacts of relay 5U0. Release of relay 6E1 results in the release of relays 6LU0, 6SC0, 6HD0, 7LLG and 7UG1.

Relays 6LU0 and 6SC0 are released in consequence of the opening of the contacts 61 of relay 6E1. The release of relay 6SC0 results in the interruption of a holding path for relay 6HD0. Relay 7UG1 is released through the opening of the contacts of relay 6E1 in series therewith and relay 5TG is operated in consequence of the closure of the normally closed contacts of relay 7UG1 in series therewith over a path including ground, contacts of relay 7UG2, contacts of relay 7UG1, contacts of relays 7HLG, 6LG0, 6LG1 . . . 6LG9, winding of relay 5TG to negative battery. Operation of relay 5TG results in the release of relay 8XH1 in consequence of the opening of contacts of relay 5TG.

Release of relay 9TS1, through the opening of the contacts of relay 10DD1, releases relay 9X1 at the contacts of relay 9TS1 in series therewith.

Relay 9HC1 releases through the opening of the contacts of relay 9X1 and relay 9HK1 operates over the normally closed contacts of relay 9X1. Relay 10HR releases through the opening of the normally closed contacts of relay 9HK1 thereby restoring the outgoing trunk selection circuit to normal.

*Outgoing trunk circuit*

In accordance with the description thus far, the controller has seized an idle trunk 0GT0 in the desired group and closed the appropriate crosspoints. The trunk now takes supervision of the call. The switch train is held operated over conductor H and ground at contacts of relays 4C, 4B and 4D (Fig. 4). The tip and ring conductors to the headquarters end of the trunk are reversed (as explained herein) as an indication to the operator at the headquarters location that an incoming call is requesting service.

When the loop is closed to the outgoing trunk circuit, relay 4A operates over a path including the tip and ring conductors T and R of the trunk, repeating coil 4T, primary winding P of relay 4A and secondary winding S of relay 4A. Relay 4B operates over the contacts of relay 4A and locks operated over the contacts of relay 4B, contacts of relay 4D and contacts of relay 4C.

The operation of relay 4B reverses the tip and ring conductors to the outgoing trunk circuit (and to the incoming trunk circuit at fire headquarters) through the operation of the contacts of relay 4B connected in circuit with relays 4L0, 4TK and 4DF. Ground is connected to conductor TA0 to the controller to indicate that the trunk is busy. The hold magnet in the line and switch circuit is held operated over conductor H, as explained above.

Relay 2C0 in the line circuit is now held operated over the sleeve conductor S from ground at the contacts of relay 4B, contacts of relay 4D and contacts of relay 4C (Fig. 4). In addition, ringing tone is supplied from oscillator 40SC over the contacts of relays 4D and 4B to the ring conductor R of the substation.

The reversal of the tip and ring leads to the incoming trunk circuit operates a polar relay in the incoming trunk circuit at the headquarters location to signal the operator there (as explained herein). When the call is answered, as described below, marginal trunk relay 4TK in the outgoing trunk circuit operates over a path including ground, primary windings P of relays 4DF, 4TK and 4LO, contacts of relay 4B, winding 7–8 of coil 4T, through the loop to the incoming trunk circuit and return over winding 4–3 of coil 4T, contacts of relay 4B, secondary windings S of relays 4LO, 4TK and 4DF to negative battery.

Operation of relay 4TK results in the operation of relay 4C over a path including ground, contacts of relay 4TK, winding of relay 4C to negative battery.

Relay 4D operates over a path including the contacts of relay 4C and locks operated over its own contacts and the contacts of relay 4B. The operation of relay 4D removes ringing tone from the line to the calling substation through the opening of the contacts of relay 4D in series with ringing generator 40SC and transfers the connection to the control of the answering operator at the headquarters location.

When the operator answers, a 130-volt simplex is placed across the tip and ring leads to the outgoing trunk (as shown herein) to operate differential relay 4DF which, in turn, operates relay 4N2 over the contacts of relay 4DF and the contacts of relay 4TK.

If the display sender is idle it grounds lead G by means not shown herein. Relay 4N2, in operating, completes a path for the operation of relay 4N3 over a path including the contacts of relay 4N2. Operation of relay 4N3 places a ground on lead ID to the line and switch circuit through the contacts of relay 4N3 and the contacts of relay 4TK. Relay 4N3 locks operated through its own contacts to the ground on lead G. Relay 4N3 also prepares a path for connecting conductors T, R and ST from the sender circuit to the outgoing trunk circuit through the contacts of relays 4MB, 4N3 and 4N1. When the identification relay 2ID0 in the line circuit operates over the path previously described for the energization of lead ID, it transmits the number of the calling station to the sender by grounding selected conductors to the display sender through cross-connections from contacts of relay 2ID0, not shown herein as not essential to an understanding of the present invention; the sender then registers the number in a manner described in the above referred to application to Dimond et al.

When the incoming trunk circuit finds an idle receiver (as explained herein) it removes the 130-volt simplex from the tip and ring conductors and releases relay 4DF. Relay 4N1 operates through the contacts of relay 4TK, contacts of relay 4DF, contacts of relay 4N3, winding of relay 4N1 to negative battery. Operation of relay 4N1 completes a signal path from the sender to the incoming trunk circuit for station identification through the closure of the contacts 41 and 42 of relay 4N1.

Resistance 4P is connected across the line through the closure of the contacts of relay 4N1 in series therewith. Ground is placed on lead ST to the sender circuit through the closure of the contacts 43 of relay 4N1 over a circuit including ground, contacts of relay 4N1, contacts of relay 4N3, contacts of relay 4MB to conductor ST. The ground condition on lead ST initiates the operation of a pulse generator, not shown, in the sender circuit to pulse the identification of the calling station in a manner described in the above-mentioned Dimond et al. application. Relay 4N2 is released through the opening of the contacts of relay 4N1 in series therewith but relay 4N3 remains operated over its locking path traced above.

When the sender completes out-pulsing the identification of the calling station to the receiver circuit, ground is removed from lead G to the sender. Relay 4N3 is released and relay 4N1 releases in consequence of the opening of the contacts of relay 4N3 in series therewith.

The release of relay 4N1 removes resistance 4P through the opening of the contacts of relay 4N1 in series therewith and extends the connection to the headquarters location for verbal communication between the calling party and the operator at headquarters. Ground is removed from lead ST to the sender circuit through the opening of the contacts 43 of relay 4N1 in series therewith.

The sender is now disassociated from the trunk circuit and a talking path exists between the station circuit and fire headquarters.

*Incoming trunk and number display circuit*

The incoming trunk circuit provides supervision and a talking and signaling path between an outgoing trunk circuit associated with the concentrators in a central office and a fire or police switchboard position. Operating in conjunction with the incoming trunk circuit is a number display circuit which provides a visual identification of the calling station number.

The incoming trunk circuit is seized when the outgoing trunk circuit at the central office reverses the conductors T and R to the incoming trunk circuit in the manner set forth above. Seizure of the trunk causes trunk lamp 14L to flash as an alerting signal to the attendant. The call is answered by the attendant through the operation of a trunk key 144 or the insertion of a cord plug into trunk jack 141 and operation of the talk key (not shown). A hold feature is provided in order that the attendant can hold the call while servicing other calls. When the attendant answers, the receiver circuit in conjunction with the sender causes the calling station number to be displayed in the number display circuit.

Specifically, reversal of the tip and ring leads T and R in the outgoing trunk circuit, as explained above, causes relay 14A to operate over a path including tip conductor T, winding 142 of repeating coil 1415, primary winding P of relay 14A, secondary winding S of relay 14A, winding 143 of coil T to the ring conductor and back over the loop to the outgoing trunk circuit at the concentrator location. Relay 14A, in operating, causes the operation of relay 14A1 over an obvious circuit. Relay 14A2 operates in consequence of the operation of relay 14A1 over the normally open contacts of relay 14A1.

Operation of relay 14A2 closes a path to the operating circuit of relays 14SL and 14SM. Relay 14SMA operates as a result of the operation of relay 14SM over an obvious path.

Relay 14T operates over a path including the contacts of relay 14A2 and trunk key 144. In addition, the contacts of relay 14A2 prepare a path for connecting ground to conductor 145A to the flash and wink circuit. The operation of relay 14A1 connects the trunk lamp 14L to lead FL over the contacts of relay 14A1. Lead FL is connected to negative battery or lead DB through contacts of the flash and wink circuit. For a detailed description of a suitable arrangement for the flash and wink circuit, reference may be made to Patent No. 2,816,958 to P. W. Wadsworth, referred to above.

When the circuit is idle and relay 14A2 is released, the operator cannot seize the trunk and thus transmit a false signal to the outgoing trunk in consequence of the contacts of relay 14A2 in series with the windings of relays 14SL and 14SM as well as the trunk key 144.

If the headquarters attendant answers the call by operating the trunk key 144, relay 14T operates over a path from negative battery, lower winding P of relay 14T, contacts of relay 14A2, trunk key 144 to ground.

Operation of relay 14T:

(1) connects trunk lamp 14L to negative battery 146;

(2) short-circuits the secondary winding of relay 14A providing supervision to the outgoing trunk;

(3) operates relays 14G and 15TS;

(4) removes ground from lead 145A to stop the flash and wink circuit; and (5) holds relay 14A2 operated.

The operation of relay 14G extends the tip and ring leads T and R and conductors 147ST and RG to the position circuit and completes a locking path through winding S of relay 14T over the contacts of relay 14G. For a comprehensive disclosure of a suitable arrangement for the position cord and grouping circuit reference may be made to the above-referred-to patent to P. W. Wadsworth.

Relay 15TS, in operating, closes a 130-volt simplex signal across the tip and ring leads T and R toward the originating office as an identification request signal through the closure of contacts 148 and 149.

If the attendant answers the call by inserting a cord plug in trunk jack 141, relay 14SL operates from the cord sleeve circuit, not shown. Operation of relay 14SL:

(1) connects trunk lamp 14L to negative battery over the contacts of relay 14SL;

(2) short-circuits winding S of relay 14A over the contacts of relay 14SL;

(3) removes ground from lead 145A; and (4) holds relay 14A2 operated.

When the cord talk key (not shown) is operated, a low resistance battery (also not shown) is connected to the cord sleeve and relay 14SM is operated. Operation of marginal relay 14SM results in the operation of relay 14SMA, as described above, and closes the 130-volt simplex signal over contacts 1411 and 1412 of relay 14SMA as an identification request signal and prepares the display control circuit for displaying the calling station number, as discussed herein.

*Display control circuit*

When the position attendant operates either trunk key 144 or inserts the cord plug into the trunk jack 141 and operates the talk key (not shown), the associated relay 15TS or 14SMA operates to prepare the display control circuit. Relay 15TR operates over a circuit including contacts of relay 15RR, contacts of relay 15TS or 14SMA and contacts of relay 15DE. Relay 15TR, in operating, operates relay 15RR through the contacts of relay 15LC.

Relay 15RR opens the operate path of relay 15TR previously traced at the contacts of relay 15RR and also opens the locking path of relay 15DC at the contacts of relay 15RR. Relay 15DC releases and removes ground from lead 15RD to release the receiver if a display is still in from the previous call.

Relay 15LC operates over the contacts of relay 15RR and contacts of the idle display receiver over leads DK and DK1 and locks to ground over its own contacts. The operation of relay 15LC indicates that the lamp display from the previous call has been cancelled. Relay 15LC also operates relay 15C over the contacts of relay 15LC, contacts of relay 15TS (or 14SMA), contacts of relay 15DE, winding of relay 15C to negative battery. Relay 15RR is released through the opening of the contacts of relay 15LC.

The operation of relay 15C:

(1) removes 130-volt simplex from leads T and R to the outgoing trunk circuit as a start pulsing signal for station identification;

(2) extends conductors T and R through to the display receiver circuit and removes relay 14A from the loop;

(3) provides a holding path for relay 14A1;

(4) closes relay 15DE over lead 15DE through to the receiver circuit to await a registration complete signal (ground condition); and (5) operates relay 15DC which holds operated under control of relay 15RR released and connects ground to lead 15RD for holding the receiver circuit.

Four numerical indicator tubes, which may illustratively be Burroughs type 6844, or the like, of which only two are shown in Fig. 15, are connected to the receiver. The numerical indicator cathodes are energized in accordance with the digits designating the calling station as registered.

When the receiver has received the digits to operate relays which ground the appropriate conductors A–, B–, C– and D– for displaying the calling line number, ground is connected to lead 15DE to operate relay 15DE.

The contacts of relay 15C in series with leads T and R (Fig. 14) remove the 130-volt simplex signal from the tip and ring leads to the outgoing trunk circuit as a start pulsing signal. The same contacts of relay 15C also remove relay 14A from the loop and associated transfer contacts extend the tip and ring leads through to the receiver circuit.

The operation of relay 15DE explained above:

(1) locks operated to ground through the contacts of relay 15TS or the contacts of relay 14SMA;

(2) removes ground at contacts 151 from the position display control circuit allowing it to return to normal;

(3) maintains the 130-volt simplex off the tip and ring conductors (Fig. 14); and (4) releases relay 15C through the opening of the contacts of relay 15DE in series therewith. The release of relay 15C completes a talking path through to the position circuit over contacts 1421 and 1422 of relay 15C.

The incoming trunk circuit, in conjunction with the associated central office equipment, has completed station identification and there is now a talking path from the calling station to the position attendant.

*Holding a call*

When a call has been answered by key, operation of the hold key operates relay 14H over the contacts of relay 14T and the contacts of the hold key. The operation of relay 14H opens the locking path of relay 14T at the contacts of relay 14H and by-passes the secondary winding of relay 14A. Lead HS to the flash and wink circuit is grounded over the contacts of relay 14H to keep the interrupter operating and the trunk lamps are connected to the winking battery on lead WK over the contacts of relay 14H.

The release of relay 14T releases relay 14G at the contacts of relay 14T and holds relay 14H under control of the contacts of relay 14SL. Relay 15TS is released at the contacts of relay 14T. The release of relay 15TS removes the number display and restores the display control circuit.

The attendant can reseize the circuit by operating trunk key 144 or inserting a cord plug in the trunk jack 141.

If the circuit is reseized by operation of the trunk key, relay 14T operates as described above. The operation of relay 14T bridges the loop, connects steady battery to the trunk lamp 14L, operates relays 14G and 15TS and releases relay 14H. Thus the conditions that existed as a result of an original answer have been re-established. The calling station number is automatically requested and redisplayed and the talking circuit is closed through to the operator in the same manner as described for an original answer.

If the operator had reseized the circuit through the insertion of a cord plug into the trunk jack TRK, relay 14SL operates as described above. The operation of relay 14SL bridges the loop, connects steady battery to the trunk lamp 14L and releases relay 14H. Here again the conditions that existed when a call was originally answered by cord have been recreated. Operation of the cord talk key requests redisplay of the calling station number and the talking circuit is closed through to the operator in the manner described above.

When a call has been answered by cord, release of the cord talk key (not shown) releases relay 14SM, in turn releasing relay 14SMA. The release of relay 14SMA removes the number display and restores the display control circuit. When the talk key is reoperated, the calling station number is redisplayed and the talking circuit is closed through in the manner described above for original answer by cord.

*Disconnect*

Upon completion of a call, the operation of a release key RLS in the position (if the call was answered by trunk key 141) removes battery and ground from leads RLS and RG.

Relay 14T is released over the contacts of relay 14G and in turn releases relays 14G and 15TS over the contacts of relay 14T.

The release of relay 15TS results in the release of relays 15DE and 15DC over the contacts of relay 15TS.

The release of relay 14T also connects the secondary winding S of relay 14A to the tip and ring leads as a disconnect signal to the outgoing trunk circuit. The outgoing trunk circuit functions in the manner previously described and releases incoming trunk relay 14A. Relay 14A1 releases over the contacts of relay 14A. Relay 14A2 is released over the contacts of relay 14A1.

If the call had been answered by cord, the removal of the plug from the jack releases relays 14SL and 14SM. Relay 14SMA is released over the contacts of relay 14SM. Relays 15DE and 15DC are released over the contacts of relay 14SMA. Release of relay 14SL connects the high resistance winding S of relay 14A to the tip and ring conductor as a disconnect signal to the outgoing trunk circuit. The outgoing trunk circuit functions in the manner described above and releases incoming trunk relay 14A. Relays 14A1 and 14A2 are released and the incoming trunk restores to normal. The release of relay 15DC restores the receiver to normal and removes the number display.

*Line identification for recording*

When line check and selective routing tests are completed as described in a preceding section, relay 10FS1 operates in parallel with relay 9TS1. The operate path for relay 10FS1 may be traced from ground, contacts of relay 10DR1, contacts of relay 10DD1, contacts of relay 10DL1, primary winding P of relay 10FS1 to negative battery. An operate path for relay 13G is prepared at the contacts of relay 10FS1. If the sender is idle, a ground in the sender circuit operates relay 13G over a circuit including ground, contacts of relay 13W, contacts of relay 13H, contacts of relay 10FS1, winding of relay 13G to negative battery. Relay 13G locks operated over a path including ground, contacts of relay 13G, contacts of relay 13W, contacts of relay 10FS1, winding of relay 13G to negative battery.

The operation of relay 13G results in the operation of relay 12IC over a path including ground, contacts of relay 10FS1, contacts of relay 13G, contacts of relay 13H, winding of relay 12IC to negative battery.

The operated relay 5U0 of the selected line connects ground to lead U0 of the diode converter (Fig. 12) which extends the ground to diodes 0DB and 0DA. Similarly, the operated relay 6HD0 connects ground to a second diode converter on leads GP0 and continues the ground to two of the six output leads. Ground on two of the six output leads of converter 121 and two of the six output leads of converter 122 identifies the tens and units equipment designation of the line being served. The two of six marks are used by the recorder sender for outpulsing digits on a two-out-of-five pulse length basis. The two grounded leads determine which two of the five pulses or digits are to be long pulses.

Relay 12IC, in operating as described above:

(1) holds to ground over the contacts of relay 12IC and the contacts of relay 10FS1;

(2) closes the output conductors of converters 121 and 122 through to relays 12D1–6 and 12C1–6 over the contacts of relay 12IC; and (3) operates relay 13FL1 over a path including ground, contacts of relay 13G, contacts of relay 10FS1, contacts of relay 12IC, contacts of relay 13H, contacts of relay 11HQ1, winding of relay 13FL1 to negative battery.

Relay 13FL1 now locks to ground over its own contacts and the contacts of relay 13G. The contacts of relay 13FL1 extend the sender circuit over a loop to an incoming recorder trunk circuit at the desired headquarters.

Relays 12C1, 12C3, 12D1 and 12D3 operate and connect ground to two of the C1–6 and D1–6 leads to the sender circuit (Fig. 13). For example, relay 12D1 is operated over a path including lead U0, diode 0DB of the diode converter, contacts of relay 12IC, operating winding of relay 12D1 to negative battery. Ground is extended to the recorder sender circuit over the contacts 131 of relay 12D1. Relay 13SG is operated over the contacts of the relay 12C1.

The operation of relay 13SG connects ground to two of six leads to the sender for identifying the hundreds digit as determined by relay 13B.

Relay 13B remains released if the line being identified is in the low hundreds group and leads BA and BB are grounded over the contacts of relay 13SG and the contacts of relay 13B.

If the line being identified is in the high hundreds group, relay 13B is operated from ground, contacts of relay 7HLG, winding of relay 13B to negative battery. In this instance, leads BC and BD to the sender circuit are grounded over the contacts of relay 13SG and the normally open contacts of relay 13B. The operation of relay 13SG also grounds leads AA and AB to the sender circuit to identify the thousands digit, and leads CLA and CLB are grounded to identify a class digit.

When the controller releases after the outgoing trunk assumes control, as described in a previous section, relay 10FS1 releases and operates relay 134 if the recorder sender is still busy. The operate path for relay 134 may be traced from ground, contacts of relays 13G, 10FS1, 10PS1, the winding of relay 13H to negative battery. Relay 13H operated, locks through contacts of relay 13H and contacts of relay 13G to ground. Relay 13H operated prevents another call being handled by the controller from interfering with the recorder sender until it is again idle.

When the receiver recorder circuit at headquarters connects to the recorder sender out-pulsing loop and is ready to receive pulses, it signals the sender over the loop and the sender out-pulses the class, thousands, hundreds, tens and units digits in that order. When the sender has completed out-pulsing the last digit in the manner described in detail in the above-referred-to application of Dimond et al., ground is removed from the winding of relay BG through the opening of contacts 132. Relay 13G releases and in doing so:

(1) releases relay 13FL1 over the contacts of relay 13G, thus opening the sender loop at the contacts of relay 13FL1, restoring the sender to normal;

(2) releases the operated relays 12D1 and 12D3 over the contacts of relay 13G.

(3) releases the operated relays 12C1 and 12C3 over the contacts of relay 13G; and (4) releases relay 13H over the contacts of relay 13G restoring the sender control circuit to normal.

The release of relays 12C1 and 12C3 in turn releases relays 13SG and 13B over the contacts of relays 12C1 and 12C3 and the contacts of relay 13SG.

If the sender completes out-pulsing before the controller releases, relay 13G releases, as explained above, and relay 13W operates over the contacts of relays 10FS1 and 12IC. Operation of relay 13W prevents relay 13G from reoperating to send a second identification of the call being serviced.

When the controller releases, relay 10FS1 releases, in turn releasing relay 12IC at the contacts of relay 10FS1. The release of relay 12IC results in the release of relays 12C1, 12C3, 12D1 and 12D3 and, in turn, release relays 13SG and 13B. When relay 13W releases, the operate path of relay 13G is ready at the contacts of relay 13W for starting a new identification cycle.

The equipment number information stored in the recorder receiver circuit is transferred to the ticketer and control circuit which latter, in conjunction with the time-of-day circuit, prints a record of the identification of the calling line and the time the service request was received as described in detail in the above-referred-to patent of F. M. Pearsall, Jr.

*Time-out features*

The functions of the controller in serving a call are guarded by a time-out circuit including a slow-release relay 7TO. Four basic controller functions which occur in sequence are guarded by relay 7TO, viz., line selection, connection of line to controller including select and hold magnet check, line check and discrimination, and out-trunk selection. When the controller is seized, as described above, the operate path of relay 7TO is opened, as shown herein, and upon completion of line selection the operate path of relay 7TO is reclosed.

Before completion of each succeeding function, the operate path of relay 7TO is opened and is reclosed when the function is completed. If any given sequence in the controller operation is not completed within the release time of relay 7TO, that relay releases and permits the release of trouble indicating relay 10TI through an auxiliary relay.

An additional time-out circuit including relay 7MTO serves to release the controller and reverse all selection chains, i.e., from low to high or high to low if, after seizure, the controller has not served the call within a predetermined time period.

*Line selection failure*

When a line requests service, a relay LG– operates, in turn releasing relay 5TG, as explained above, and when line selection is completed relay 6E1 operates. The release of relay 5TG opens the operate path of relay 7TO at the contacts of relay 5TG in Fig. 7 and the operation of relay 6E1 recloses the path to hold relay 7TO operated. The latter path includes ground, contacts of relays 8XH1, 6AZ, 6E1, 7UG1, 8FDF, 9TS1, 9TS2 through similar circuitry for police calls, winding of relay 7TO to negative battery.

If the line selection is not completed, relay 6E1 does not operate and relay 7TO releases. The release of relay 7TO operates relay 7TO1 which, in turn, releases relay 10TI, a trouble indicator relay, over an obvious path.

*Select or hold magnet open circuit or cross connection fault*

When line selection is completed, as described above, relay 6E1 operates to reclose the operate path of relay 7TO which remains operated. The operation of relay 7UG1 now reopens the operate path of relay 7TO. If the switch select and hold magnet checking operations prove satisfactory, relays 7HT1 and 7SCK1 are operated to reclose the operating path for relay 7TO over the circuit previously traced including ground, contacts of relays 8XH1, 6AZ, 6E1, 7SCK1, 7HT1, 7UG1, 8FDF, 9TS1, 9TS2, through similar circuitry for police calls, winding of relay 7TO to negative battery.

If the select magnet path is open, relay 5XS1 fails to operate and prevents the operation of relay 7SCK1. A cross connection in the hold magnet path increases the current through relay 8XH1 preventing its operation.

Either of these conditions will permit relay 7TO to release, in turn operating relay 7TO1, followed by the slow release of trouble indicating relay 10TI.

*Line check and discrimination fault*

When the line switch select and hold magnet paths are checked, ground is connected to relay 7TO during the release time of relay 7HT1.

Relay 8DH1, which operates in series with the line check hold magnet, opens the operating path of slow-release relay 8FDF at the contacts of relay 8DH1. The crosspoints are closed, as described heretofore, and relay 10DD1 operates to hold relay 8FDF and relay 7TO operated. Relay 7TO remains operated over the contacts of relay 10DD1 and the contacts of relay 7TOH during the release time of relay 7TOH.

If the line check and discrimination tests are not completed, relays 8FDF and 7TO release. Release of relay 7TO operates relay 7TO1 which, in turn, releases trouble indicating relay 10TI.

*Outgoing trunk selection fault*

When the line check and selective routing tests are completed, relay 9TS1 operates. After a trunk has been selected and connected to the calling line, relay 10HR operates to reclose the operating path for relay 7TO. This path may be traced from ground, contacts of relay 10HR, contacts of relay 9TS1, contacts of relay 9TS2, similar circuitry for police calls, winding of relay 7TO to negative battery.

If an outgoing trunk is not connected to the calling line, relay 10HR does not operate, permitting relay 7TO to release. The release of relay 7TO operates relay 7TO1 which in turn releases trouble indicating relay 10TI.

It is understood that the embodiments shown are merely exemplary and that various modifications will be apparent to those skilled in the art without departing from the scope of the present invention.

What is claimed is:

1. A telephone emergency reporting alarm system including a substation, a telephone central office to which said substation is connected and an emergency service headquarters, means at said central office connectable to said substation for generating two distinct groups of digital pulses, each group representative of the full identification of said substation, a plurality of signaling channels connecting said central office to said service headquarters, and means at said central office responsive to a calling condition at said substation for transmitting one of said groups of digits over one of said channels and the other of said groups of digits over another of said channels.

2. An emergency reporting alarm system including a substation, a telephone central office to which said substation is connected, and a plurality of emergency service headquarters, a plurality of signaling channels between said central office and said service headquarters, means at said central office and at said substation jointly operable responsive to a calling condition at said substation for selecting a particular emergency headquarters, means at said central office connectable to said substation for registering the directory identification of said substation, additional means at said central office connectable to said substation for registering the equipment identification of said substation, and means for concurrently transmitting said equipment information and directory information over independent channels to said particular headquarters.

3. A telephone emergency reporting system including a telephone substation, a telephone central office, a substation line coupling said substation to said office, and a plurality of emergency service headquarters, means at said central office connectable to said substation line including identification relay means for identifying the directory designation of said line, controller means at said central office responsive to the energization of said line to ascertain the equipment designation of said line corresponding to the physical location of said line, a plurality of trunks between said central office and said service headquarters, means at said service headquarters responsive to the seizure of one of said trunks for operating said identification relay means, additional means at said central office governed by the operation of said identification relay means for initiating the transmission of said directory designation of said line over said one trunk, and means at said central office governed by said controller means responsive to the energization of said line for initiating the transmission of coded pulses representing said equipment designation over a different one of said trunks.

4. A telephone reporting system including a substation, a substation line, a telephone central office and a plurality of service headquarters, means at said telephone central office connectable to said substation line for generating two distinct groups of digital pulses, each group representative of the identification of said substation, an asymmetrically conducting impedance device at said substation interposed in series with said line, means in said central office for reversing the polarity of line current to said substation, means at said substation for by-passing said asymmetrically conducting device, discriminating means at said central office responsive to variations in line current occasioned by said reversal of polarity for selecting a particular service headquarters, a plurality of channels coupling said central office to said service headquarters, and means at said central office for concurrently transmitting one of said groups of said digits over one of said channels and the other of said groups of digits over another of said channels.

5. A telephone reporting system in accordance with claim 4 wherein said asymmetrically conducting device comprises a semiconductor diode.

6. A telephone reporting alarm system including a substation, a substation line, a telephone central office including means connectable to said substation line for generating two groups of digital pulses, said groups respectively indicating the equipment and directory number designations of said substation, a service headquarters, a plurality of signaling channels between said central office and said service headquarters, means at said central office responsive to a calling condition at said substation for concurrently transmitting said groups of digital pulses over independent channels to said headquarters, means including answering means at said emergency service headquarters connectable to said channel over which said pulses representing said directory number are transmitted for placing said channel in a hold condition and disconnecting said answering means from said channel, and additional means at said headquarters for subsequently reconnecting said channel to said answering means.

7. An emergency reporting alarm system including a substation, a substation line, a telephone central office, controller means and crossbar switch apparatus at said central office including a plurality of select magnets and vertical magnets connectable to said substation line and operable to generate two distinct groups of digital pulses, said groups respectively designating the directory and equipment number designations of said line, a service headquarters, a plurality of signaling channels between said central office and said service headquarters, means at said central office responsive to a calling condition at said substation for concurrently transmitting said groups of digital pulses over independent channels, and differential relay means at said central office responsive to the operation of said crossbar switch apparatus for preventing the operation of a number of select magnets in excess of a predetermined number.

8. An emergency reporting alarm system in accordance with claim 7 including, in addition, differential relay means at said central office responsive to the operation of said crossbar switch apparatus for preventing the operation of a number of select magnets in said crossbar switch in excess of a predetermined number.

9. A telephone reporting alarm system including a substation, a substation line, a telephone central office and a plurality of service headquarters, means connectable to said substation line for generating two groups of code pulses, said groups respectively signifying the equipment and directory number designations of said substation, a plurality of signaling channels between said central office and said headquarters, means at said central office responsive to a calling condition at said substation for concurrently transmitting said groups of digits over independent channels to said headquarters, and additional means at said service headquarters responsive to the reception of said group of digits designating said directory number to register said number.

10. A telephone reporting alarm system in accordance with claim 9 wherein said additional means at said service headquarters to register said number includes a plurality of cold cathode number indicator tubes.

11. A telephone emergency reporting alarm system including a plurality of substations, a telephone central office, a plurality of emergency service headquarters, a plurality of lines individually linking said substations to said telephone central office, a plurality of trunks connecting said telephone central office to said service headquarters, selective routing means at said substation including a routing switch and a diode normally by-passed by said routing switch, means for operating said routing switch to insert said diode in circuit, means at said central office responsive to a calling condition at said substation for reversing the polarity of current to said substation, discriminator means at said central office responsive to variations in current flow in consequence of said reversal of polarity for selecting a particular service headquarters, means at said central office responsive to a calling condition at said substation for generating two groups of digital pulse trains, said groups respectively designating the directory and equipment number of said substation, and means at said central office for concurrently transmitting said groups of digits from said central office to said selected service headquarters over independent trunks.

12. Selective routing means for an emergency reporting system including a telephone substation, an asymmetrically conducting impedance device connected in series with said substation, a routing switch connected in shunt with said impedance device, a telephone central office, a line coupling said substation to said office, means included in said central office responsive to a calling condition at said substation for reversing the polarity of current to said substation, a plurality of trunks outgoing from said central office, means in said central office responsive to variations in line current occasioned by said reversal of polarity and the shunting of said impedance device by said routing switch to seize a particular outgoing trunk, and additional means in said central office responsive to variations in line current occasioned by said reversal of polarity and the actuation of said routing switch to remove the shunt connection from said impedance device to seize another outgoing trunk.

13. Selective routing means for an emergency reporting system in accordance with claim 12 wherein said means responsive to variations in line current includes marginal relay means.

14. Concentrator switching apparatus for an emergency reporting alarm system including a crossbar switch having a plurality of vertical and horizontal conductive paths, a plurality of vertical magnets and a plurality of horizontal magnets, horizontal and vertical bars respectively controlled by the operation of said magnets, contact sets disposed at the intersection of said horizontal and vertical bars, a plurality of incoming lines and a plurality of outgoing trunks, means for divorcing the electrical circuits of the horizontal paths of a portion of said switch from the horizontal paths of the remainder of said switch, means for connecting one-half of said incoming lines to said horizontal paths on one side of said switch, means for connecting the other half of said incoming lines to the horizontal paths of the remainder of said switch, and means for connecting said outgoing trunks to said vertical paths whereby the horizontal paths of one portion of said switch are connectable to a portion of the vertical paths of said switch and the horizontal paths of the remainder of said switch are connectible to the remainder of said vertical paths.

15. Concentrator switching apparatus for an emergency reporting alarm system in accordance with claim 14 wherein said horizontal paths are electrically divorced to equally divide the number of vertical paths on each side of said switch.

16. A telephone emergency reporting alarm system including a substation, a substation line, a telephone central office and a plurality of service headquarters, means connectable to said substation for generating two groups of digital code pulse trains, said groups respectively designating the equipment and directory number designations of said substation, a plurality of signaling channels between said central office and said headquarters, means at said central office responsive to a calling condition at said substation for concurrently transmitting said groups of pulses over separate channels to said headquarters, means including answering means at said headquarters connectable to said channel over which said pulses representing said directory number are transmitted for placing said channel in a hold condition and disconnecting said answering means from said channel, means at said headquarters responsive to the reception of said digital pulses designating said directory number to visually display said number, and additional means at said headquarters for subsequently reconnecting said channel to said answering means.

17. A telephone emergency reporting system including a substation, a substation line, a telephone central office and a plurality of service headquarters, means connectable to said substation line for generating two groups of digital pulse trains, said groups respectively representing the equipment and directory number designations of said substation, a plurality of signaling channels between said central office and said service headquarters, means at said central office responsive to a calling condition at said substation for concurrently transmitting said groups of digital pulse trains over different channels to said headquarters, answering means at said emergency service headquarters, means at said headquarters connectable to said channels over which said pulses representing said directory number are transmitted for placing said channel in a hold condition and disconnecting said answering means from said channel, means at said service headquarters responsive to the reception of said group of digits designating said directory number to register said number, means at said headquarters for subsequently reconnecting said channel to said answering means, and further means at said headquarters responsive to the reconnection of said channel to said answering means for reregistering said directory number.

18. In a telephone emergency reporting alarm system, a crossbar switch checking circuit comprising a crossbar switch having a plurality of vertical and horizontal conductive paths, a plurality of vertical and horizontal magnets, vertical and horizontal bars respectively controlled by the operation of said magnets, contact sets disposed at the intersection of said horizontal and vertical bars and adapted to be operated in response to the actuation of the associated horizontal and vertical bars, relay checking means including an operating winding interposed in series with the operating path of said vertical magnets, impedance means connected in shunt with said operating winding, means for limiting the amount of current through said operating winding to an adequate level to insure the operation of said checking relay if a predetermined number of vertical magnets is operated, and means for shunting sufficient current through said impedance means to release said checking relay means if more than a predetermined number of vertical magnets is operated.

19. In a telephone emergency reporting system, a crossbar switch check circuit including a crossbar switch having a plurality of vertical and horizontal conductive paths, a plurality of vertical magnets and horizontal magnets, vertical and horizontal bars respectively responsive to the operation of said magnets, contact sets disposed at the intersection of said horizontal and vertical bars and adapted to operate in response to the actuation of the associated horizontal and vertical bars, checking relay means serially connected in the operating path of said horizontal magnets, means for operating said checking relay means if the number of horizontal magnets connected thereto is equal to a predetermined number, and means for releasing said checking relay means if the number of horizontal magnets connected thereto exceeds a predetermined number.

20. In a telephone emergency reporting system in accordance with claim 19 wherein said checking relay means comprises a relay having a primary and a secondary winding, said windings being differentially wound, means for connecting the primary winding of said relay in series with said horizontal magnets and means for connecting said secondary winding of said relay to a source of fixed potential, whereby current flow through said primary winding in consequence of the connection thereto of a predetermined number of horizontal magnets enables the operation of said relay and current flow through said primary winding in consequence of the connection thereto of a number of horizontal magnets exceeding the predetermined number causes the release of said checking relay.

21. A telephone reporting system including a substation, a substation line, a telephone central office and a plurality of emergency service headquarters, means at said telephone central office connectable to said substation line for generating two distinct groups of digital pulse code trains, said groups respectively indicating the equipment and directory number designations of said substation, a service headquarters, a plurality of signaling channels between said central office and said service headquarters, means at said central office responsive to a calling condition at said substation for concurrently transmitting said groups of digital pulses to said headquarters over separate channels, means including answering means at said emergency service headquarters connectable to said channel over which said pulses representing said directory number are transmitted for placing said channel in a hold condition and disconnecting said answering means from said channel, and additional means at said headquarters for subseqetly reconnecting said channel to said answering means, said means for generating said pulses representing the equipment number including diode matrix translating means at said central office connectable to said channel over which said pulses representing said equipment number are transmitted for translating said equipment number designation from a decimal code to the pulse code utilized in transmission.

22. A telephone reporting system in accordance with claim 21 wherein said diode matrix translator includes a plurality of decimal input leads operable in accordance with the tens and units designation of said substation and a plurality of output leads representing in a two-out-of-six code the equivalent representation of said tens and units designations.

23. A telephone emergency reporting system including a substation, a substation line, a telephone central office and a plurality of service headquarters, means at said central office connectable to said substation line including identification relay means for identifying the directory designation of said line, a diode matrix converter at said central office, controller means at said central office responsive to a calling condition on said line for governing said diode matrix converter to identify the equipment number designation of said line, a plurality of trunks between said central office and said service headquarters, means at said service headquarters responsive to the seizure of one of said trunks for controlling the operation of said identification relay means, additional means at said central office governed by the operation of said identification relay means for initiating the transmission of said directory designation of said calling line over said trunk, and means at said central office governed by said controller means for initiating the transmission of coded pulses representing said equipment number designation over a different one of said trunks.

24. A telephone emergency reporting system in accordance with claim 23 comprising, in addition, means including answering means at said headquarters connectable to said trunk over which said pulses representing said directory number are transmitted for placing said trunk in a hold condition and disconnecting said answering means from said trunk, means at said service headquarters responsive to the reception of said pulses designating said directory number to visually display said number before an operator, means at said headquarters for subsequently reconnecting said trunk to said answering means, and further means at said headquarters responsive to the reconnection of said trunk to said answering means for visually redisplaying said directory number before the operator.

25. A telephone emergency reporting system including a telephone substation, a telephone central office, a substation line coupling said substation to said office, and a plurality of emergency service headquarters, means at said central office connectable to said substation line including identification relay means for identifying the directory designation of said line, an asymmetrically conducting device at said substation interposed in series with said line, means in said central office for reversing the polarity of line current to said substation, discriminating means at said central office responsive to variations in line current occasioned by said reversal of polarity for selecting a particular service headquarters, controller means at said central office responsive to the energization of said line to ascertain the equipment designation of said line corresponding to the physical location of said line termination at said central office, a plurality of trunks between said central office and said service headquarters, means at said service headquarters responsive to the seizure of one of said trunks for operating said identification relay means, additional means at said central office governed by the operation of said identification relay means for initiating the transmission of coded pulses representing said directory designation of said line over said one trunk, and means at said central office governed by said controller means for initiating the transmission of coded pulses representing said equipment designation over a different one of said trunks.

26. A telephone reporting alarm system including a substation, a substation line, a telephone central office including means connectable to said substation line for generating two groups of digital pulses, said groups respectively signifying the equipment and directory number designations of said substation, an emergency service headquarters, a plurality of signaling channels between said central office and said service headquarters, an asymmetrically conducting impedance device at said substation serially interposed in said line, means in said central office for reversing the polarity of line current to said substation, means at said substation for by-passing said asymmetrically conducting device, discriminating means at said central office responsive to variations in line current occasioned by said reversal of polarity for selecting a particular service headquarters, means at said central office responsive to a calling condition at said substation for concurrently transmitting said groups of digital pulses over independent channels to said headquarters, means including answering means at said selected emergency service headquarters connectable to said channel over which said pulses representing said directory number are transmitted for placing said channel in a hold condition and disconnecting said answering means from said channel, and additional means at said selected headquarters for subsequently reconnecting said channel to said answering means.

27. A telephone emergency reporting alarm system including a substation, a substation line, a telephone central office and a plurality of service headquarters, means connectable to said substation for generating two groups of digital code pulse trains, said groups respectively designating the equipment and directory number designations of said substation, a plurality of signaling channels between said central office and said headquarters, an asymmetrically conducting impedance device at said substation interposed in series with said line, means in said central office for reversing the polarity of line current to said substation, means at said substation for by-passing said asymmetrically conducting device, discriminating means at said central office responsive to variations in line current occasioned by said reversal of polarity for selecting a particular service headquarters, means at said central office responsive to a calling condition at said substation for concurrently transmitting said groups of pulses over separate channels to said selected headquarters, means including answering means at said selected headquarters connectable to said channel over which said pulses representing said directory number are transmitted for placing said channel in a hold condition and disconnecting said answering means from said channel, means at said selected headquarters responsive to the reception of said digital pulses designating said directory number to visually display said number before an operator, and additional means at said selected headquarters for subsequently reconnecting said channel to said answering means.

28. A telephone emergency reporting system including a substation, a substation line, a telephone central office and a plurality of emergency service headquarters, means connectable to said substation for generating two groups of digital pulse trains, said groups respectively indicating the equipment and directory number designations of said substation, a plurality of signaling channels between said central office and said service headquarters, an asymmetrically conducting impedance device at said substation interposed in series with said line, means in said central office for reversing the polarity of line current to said substation, means at said substation for by-passing said asymmetrically conducting device, discriminating means at said central office responsive to variations in line current occasioned by said reversal of polarity for selecting a particular service headquarters, means at said central office responsive to a calling condition at said substation for concurrently transmitting said groups of digital pulse trains over different channels to said selected headquarters, answering means at said emergency service headquarters connectable to said channel over which said pulses representing said directory number are transmitted, means at said headquarters for placing said channel in a hold condition and disconnecting said answering means from said channel, means at said service headquarters responsive to the reception of said group of digits designating said directory number to visually display said number, means at said headquarters for subsequently reconnecting said channel to said answering means, and further means at said headquarters responsive to the reconnection of said channel to said answering means for visually redisplaying said directory number.

29. A telephone reporting system including a substation, a substation line, a telephone central office and a plurality of emergency service headquarters, means at said telephone central office connectable to said substation line for generating two distinct groups of digital pulse code trains, said groups respectively representing the equipment and directory number designations of said substation, a plurality of signaling channels between said central office and said service headquarters, a diode at said substation interposed in series with said line, means in said central office for reversing the polarity of line current to said substation, means at said substation for bypassing said diode, discriminating means at said central office responsive to variations in line current occasioned by said reversal of polarity for selecting a particular service headquarters, means at said central office responsive to a calling condition at said substation for concurrently transmitting said groups of digital pulses to said selected headquarters, means including answering means at said emergency service headquarters connectable to said channel over which said pulses representing said directory number are transmitted for placing said channel in a hold condition and disconnecting said answering means from said channel, and additional means at said headquarters for subsequently reconnecting said channel to said answering means, said means for generating the pulses designating said equipment number including diode matrix translating means at said central office connectable to said channel over which said pulses representing said equipment number are transmitted for translating said equipment number designation from a decimal code to the pulse code utilized in transmission.

30. A telephone reporting alarm system including a substation, a substation line, a telephone central office including means connectable to said substation line for generating two groups of digital pulses, said groups respectively designating the equipment and directory number designations of said substation, said means for generating said pulses designating the equipment number designation including diode matrix translating means at said central office for translating said equipment number designation from a decimal code to the pulse code utilized in transmission, an emergency service headquarters, a plurality of signaling channels between said central office and service headquarters, means at said central office responsive to a calling condition at said substation for concurrently transmitting said groups of digital pulses over independent channels to said headquarters, means including answering means at said emergency service headquarters connectable to said channel over which said pulses representing said directory number are transmitted for placing said channel in a hold condition and disconnecting said answering means from said channel, and additional means at said headquarters for subsequently reconnecting said channel to said answering means.

31. A telephone reporting alarm system including a substation, a substation line, a telephone central office and a plurality of service headquarters, means at said central office connectable to said substation for generating two groups of code digital pulses, said groups respectively signifying the equipment and directory number designations of said substation, a plurality of signaling channels between said central office and said headquarters, means at said central office responsive to a calling condition at said substation for concurrently transmitting said groups of digits over independent channels to said headquarters, said means for generating said pulses designating the equipment number designation including diode matrix translating means at said central office connectable to said channel over which said pulses representing said equipment number are transmitted for translating said equipment number designation from a decimal code to the pulse code utilized in transmission, and additional means at said service headquarters responsive to the reception of said group of digits designating said directory number to visually display said number before an operator.

32. A telephone emergency reporting alarm system including a plurality of substations, a telephone central office, a plurality of emergency service headquarters, a plurality of lines individually linking said substations to said telephone central office, a plurality of trunks connecting said telephone central office to said service headquarters, selective routing means at said substation including a routing switch and a semiconductor diode normally by-passed by said routing switch, means for operating said routing switch to insert said diode in circuit, means at said central office responsive to a calling condition at said substation for reversing the polarity of current to said substation, discriminator means at said central office responsive to variations in current flow in consequence of said reversal of polarity for selecting a particular service headquarters, means at said central office responsive to a calling condition at said substation for generating two groups of digital pulse trains, said groups respectively representing the directory and equipment number of said substation, and means at said central office for concurrently transmitting said groups of digits from said central office to said selected service headquarters over independent channels, said means for generating said pulses designating the equipment number including diode matrix translating means at said central office connectable to said channel over which said pulses representing said equipment number are transmitted for translating said equipment number designation from a decimal code to the pulse code utilized in transmission.

No references cited.